US012586056B2

(12) United States Patent
Bianconi

(10) Patent No.: US 12,586,056 B2
(45) Date of Patent: *Mar. 24, 2026

(54) MICROPROCESSOR AS A SECURITY LAYER

(71) Applicant: SUMUP PAYMENTS LTD., London (GB)

(72) Inventor: Stefano Bianconi, Berlin (DE)

(73) Assignee: SUMUP PAYMENTS LTD., London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/809,266

(22) Filed: Aug. 19, 2024

(65) Prior Publication Data

US 2024/0412195 A1 Dec. 12, 2024

Related U.S. Application Data

(63) Continuation of application No. 18/000,235, filed as application No. PCT/US2021/051846 on Sep. 24, 2021, now Pat. No. 12,093,923.

(60) Provisional application No. 63/082,749, filed on Sep. 24, 2020.

(51) Int. Cl.
| | |
|---|---|
| *G06Q 20/34* | (2012.01) |
| *G06K 7/00* | (2006.01) |
| *G06K 7/10* | (2006.01) |
| *G06Q 20/20* | (2012.01) |
| *G07F 7/08* | (2006.01) |
| *G09G 3/36* | (2006.01) |
| *H04B 5/26* | (2024.01) |
| *H04B 5/70* | (2024.01) |

(52) U.S. Cl.
CPC ............. *G06Q 20/34* (2013.01); *G06K 7/006* (2013.01); *G06K 7/0091* (2013.01); *G06K 7/10297* (2013.01); *G06Q 20/20* (2013.01); *G07F 7/0886* (2013.01); *G09G 3/36* (2013.01); *H04B 5/26* (2024.01); *G09G 2310/02* (2013.01); *G09G 2340/0435* (2013.01); *H04B 5/70* (2024.01)

(58) Field of Classification Search
CPC ..... G06Q 20/34; G06K 7/006; G06K 7/10297
See application file for complete search history.

(56) References Cited

U.S. PATENT DOCUMENTS

| | | | | |
|---|---|---|---|---|
| 10,595,400 | B1 * | 3/2020 | Razaghi | H05K 1/0275 |
| 11,087,301 | B1 * | 8/2021 | Razaghi | G07F 7/088 |
| 11,416,690 | B2 * | 8/2022 | Pavageau | G06K 7/0021 |
| 12,093,923 | B2 * | 9/2024 | Bianconi | G06K 7/10198 |
| 2008/0251906 | A1 * | 10/2008 | Eaton | H01L 25/16 |
| | | | | 438/109 |
| 2016/0253527 | A1 * | 9/2016 | Mcfall | G07C 9/33 |
| | | | | 726/34 |
| 2022/0036016 | A1 * | 2/2022 | Chen | G06K 7/0091 |

* cited by examiner

*Primary Examiner* — Sonji N Johnson
(74) *Attorney, Agent, or Firm* — Synergy Patent Group LLC

(57) ABSTRACT

Various aspects of the disclosure generally relate to security for a credit card processing reader. Part of security for a reader is protecting sensitive components, for example components that access information from a credit card during a transaction. An alternative security configuration may include integrated circuits replacing portions of electrically active mesh. This may reduce the size and cost of a reader while maintaining its security with respect to published guidelines.

20 Claims, 18 Drawing Sheets

202

208

204

206

MICROPROCESSOR AS A SECURITY LAYER

CROSS-REFERENCE TO RELATED APPLICATIONS

This application is a continuation that claims priority under 35 U.S.C. § 120 to U.S. patent application Ser. No. 18/000,235, filed Feb. 28, 2023, entitled MICROPROCES-SOR AS A SECURITY LAYER, and is hereby incorporated by reference in its entirety, which in turn claims the benefit of and priority to international application PCT/US2021/051846, filed Sep. 24, 2021, entitled MICROPROCESSOR AS A SECURITY LAYER, and is hereby incorporated by reference in its entirety, which in turn claims the benefit of and priority to U.S. Provisional Patent Application No. 63/082,749, filed Sep. 24, 2020, entitled Secure Point-of-Sale Device, and is hereby incorporated by reference in its entirety.

BACKGROUND

Field of the Disclosure

The disclosure relates generally to credit card processing readers, and more specifically to reducing the size and cost while maintaining security with the reader.

Description of Related Art

Fundamental to the functioning of the economy is the exchange of payment for goods and services. Throughout modern commercial history, payment has typically been rendered with money in the form of currency or cash such as banknotes and coins. Cash continues to be used to purchase goods and services, but it is becoming increasingly less common. In the United States, a study by Tufts University concluded that the cost of using cash amounts to around $200 billion per year. This is primarily the costs associated with collecting, sorting and transporting the physical currency, but also includes expenses like automated teller machine (ATM) fees. The study also found that the average American wastes five and a half hours per year withdrawing cash from ATMs, which is just one of the many inconvenient aspects of physical currency. Physical currency is often unhealthy too. Researchers in Ohio spot-checked cash used in a supermarket and found 87% contained harmful bacteria.

Conventional financial transactions are fundamentally based on the value of currency, but often involve the transfer of funds that do not require the physical exchange of cash.

In the United States, the Federal Reserve Bank's Automated Clearing House (ACH) Network is a processing and delivery system that provides for the distribution and settlement of electronic credits and debits among financial institutions, and functions as an electronic alternative to paper checks. Unlike a check, which is always a debit instrument, an ACH entry may be either a credit or a debit entry. The ACH Network is also widely used to settle consumer transactions made at ATMs and point-of-sale (POS) terminals.

Physical currency is already being replaced by cryptocurrencies like Bitcoin. Bitcoin allows for direct transfers of funds between parties, without the need for a third party. A wide range of startups are now developing products based on the Bitcoin protocols, in the hope that it will compete with other global payment systems. Cash transactions worldwide rose just 1.75% between 2008 and 2012, to $11.6 trillion. Meanwhile, non-traditional payment methods rose almost 14% to total $6.4 trillion. This group includes online and mobile payment systems including PayPal, Google Wallet, Apple Passbook, and other cashless alternatives.

Thrive Analytics 2014 Digital Wallet Usage Study revealed that, despite nearly 80% of consumers being aware of digital wallets, including major players like PayPal, Google Wallet, and Apple Passbook, security concerns remain the main barrier to adoption, followed by lack of usability versus credit cards/cash (37%) and not being top of mind as a form of payment at the time of purchase (32%). Meanwhile, MasterCard and Visa face obstacles as they try to become players in the digital wallet game.

Other companies produce a point-of-sale credit card reader and app that provides transparent pricing, reliable technology and is available for major credit cards plus Google Pay and Apple Pay. Contrasting this with a traditional credit card terminal, which contains the hardware and software for generating an authorization request, these card readers work in conjunction with online systems to generate that request. Security and ensuring the secrecy of user credit card information is paramount in any credit card reader and strict standards apply to the construction and operation of these POS readers. While meeting security standards, the makers of these readers must design a product that is cost effective, compact, and meets global security standards for credit card devices.

SUMMARY

A device includes a case, a printed circuit board (PCB) coupled to the case, the PCB with a first side and a second side. The first and second sides are parallel and opposite to one another, and at least one via extends through the PCB from the first side to the second side. A microprocessor is coupled to the first side of the PCB and is electrically coupled to the via. The microprocessor has a footprint defined by a boundary line drawn around the perimeter of the microprocessor. The boundary line is perpendicular to the plane of the microprocessor and through the PCB. The microprocessor has at least one input/output (I/O) pin within the microprocessor footprint and between the top of the microprocessor and the first side of the PCB. A first mesh is coupled to the PCB and includes a plurality of electrical traces as part of an electrical circuit. The plurality of electrical traces of the first mesh has a spacing between two immediately adjacent traces of no more than 150 micrometers throughout the first mesh. The first mesh exists on a plane parallel to the first and second sides. At least one electrode is coupled to the second side of the PCB and is electrically coupled to the I/O pin through the via. The electrode is within the microprocessor footprint.

A cover may be coupled to the second side of the PCB, the cover further includes a second mesh coupled to the cover. The second mesh includes a plurality of electrical traces as part of an electrical circuit. The plurality of electrical traces of the second mesh has a spacing between two immediately adjacent traces of no more than 150 micrometers throughout the second mesh; the second mesh exists on a plane parallel to the cover.

The first mesh may be outside of the microprocessor footprint. The second mesh may form a plane parallel to the cover and has a surface area approximately equal to the surface area of the first mesh added to the surface area of the microprocessor. The first mesh is outside and inside the microprocessor footprint. The first mesh is one of a plurality of layers within the PCB, between the first and second sides. The microprocessor footprint may have a rectangular shape, the microprocessor footprint being bordered on all four sides by the first mesh. The microprocessor footprint has a rectangular shape, the microprocessor footprint being bordered on fewer than four sides by the first mesh. The at least one via may traverse in a straight line from the first side of the PCB to the second side of the PCB. The at least one via may traverse through the PCB from the first side to the second side in a line having a plurality of turns, such that the via is not entirely perpendicular to the PCB. The electrode may be a secure card pin. The at least one via may be a plurality of vias. The at least one electrode may be a plurality of electrodes including a secure card pin. The at least one I/O pin may be a plurality of I/O pins. The plurality of electrodes may be electrically coupled to the plurality of I/O pins through the plurality of vias and entirely within the microprocessor footprint. At least one of the plurality of vias may extend outside the microprocessor footprint. All of the above may be a point-of-sale credit card reader.

A credit card processing reader may include a case, a printed circuit board (PCB) coupled to the case. The PCB has a first side and a second side. The first and second sides are parallel and opposite to one another, wherein at least one via extends through the PCB from the first side to the second side. An integrated circuit may be coupled to the first side of the PCB. The integrated circuit may have a footprint defined by a boundary line drawn around the perimeter of the integrated circuit, the boundary line perpendicular to the plane of the integrated circuit and through the PCB. A first mesh may be coupled to the PCB and include a plurality of electrical traces as part of an electrical circuit. The plurality of electrical traces of the first mesh may have a spacing between two immediately adjacent traces of no more than 150 micrometers throughout the first mesh. The first mesh exists on a plane parallel to the first and second sides. At least one electrode may be coupled to the second side of the PCB. The at least one electrode may be configured to access data from a credit card during a credit card transaction. The at least one electrode may be coupled to the at least one via, the at least one electrode within the integrated circuit footprint. The first mesh may be entirely outside the integrated circuit footprint.

The reader may include a microprocessor coupled to the PCB. The microprocessor may have at least one input/output (I/O) pin. The at least one electrode may comprise a plurality of electrodes, including a secure card (SC) pin. The SC pin may be coupled to the microprocessor. The integrated circuit footprint may have a rectangular shape. The integrated circuit footprint may be bordered on fewer than four sides by the first mesh. A cover may be coupled to the second side of the PCB. The cover may further include a second mesh coupled to the cover. The second mesh may include a plurality of electrical traces as part of an electrical circuit. The plurality of electrical traces of the second mesh may have a spacing between two immediately adjacent traces of no more than 150 micrometers throughout the second mesh. The second mesh may exist on a plane parallel to the cover. The second mesh may form a plane parallel to the cover and may have a surface area greater than the surface area of the first mesh.

The foregoing has outlined rather broadly the gestures and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of this disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
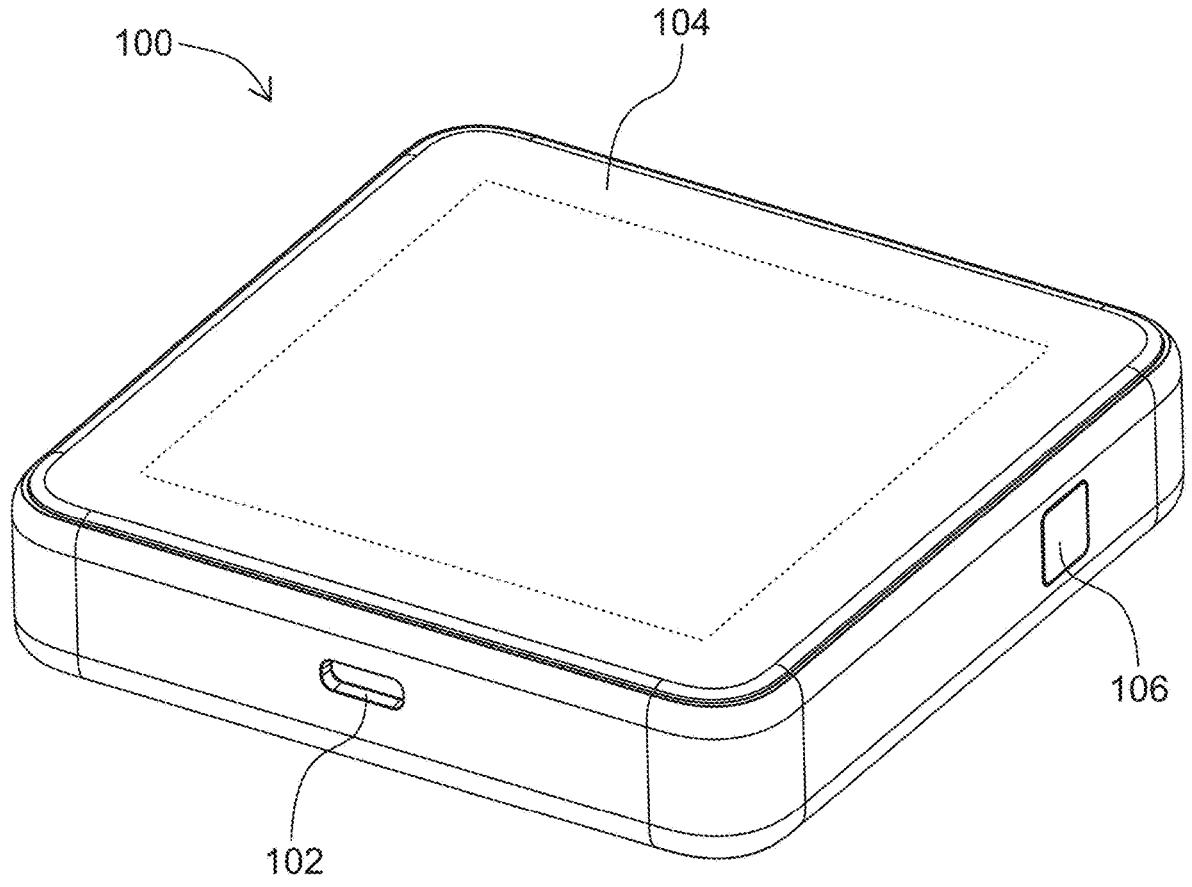
FIG. 1 is a top right perspective view illustrating one example of a credit card reader.

Various aspects of the disclosure are described more fully herein with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented, or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure may be embodied by one or more elements of a claim.

A point-of-sale (POS) credit card reader may physically interact with payment instruments such as magnetic stripe payment cards, Europay, MasterCard and Visa (EMV) payment cards, and short-range communication (e.g., near field communication (NFC), radio frequency identification (RFID), Bluetooth, Bluetooth® low energy (BLE), etc.) payment instruments. The reader may provide a rich user interface through the display, communicate with the payment reader, and communicate with a payment processing service server, which may communicate with payment processing service provider server(s). In this manner, the reader may collectively process transaction(s) between a merchant and customer(s).

POS readers may be mobile, such that POS readers may process transactions in disparate locations across the world. For various reasons, a payment processing service provider may contract with a payment processing service regarding where the payment processing service is permitted to collectively process card-present transactions between merchants that utilize POS readers serviced by the payment processing service and customers. As a non-limiting example, a payment processing service provider may contract with a payment processing service such that the payment processing service is permitted to process card-present transactions on behalf of a merchant via a POS reader serviced by the payment processing service in one or more particular regions but is not permitted to process transactions on behalf of the merchant in any region that is not one of the one or more particular regions. For instance, a payment processing service provider may contract with a payment processing service such that the payment processing service is permitted to process card-present transactions on behalf of the merchant in the United States, Canada, and Australia, but is not permitted to process card-present transactions on behalf of the merchant in any other country. That is, if the merchant tries to transact with a customer in China via a card-present transaction using a POS reader serviced by the payment processing service and the payment processing service processes the card-present transaction, the payment processing service may breach its contract with the payment processing service provider. Accordingly, the payment processing service may refrain from processing the card-present transaction (i.e., the payment processing service may not transmit the card-present transaction to the payment processing service provider) to avoid breaking its contract with the payment processing service provider.

For the purpose of this disclosure, a card-present transaction is a transaction where both a customer and their payment instrument are physically present at the time of the transaction. Card-present transactions may be processed by swipes, dips, and/or taps. A swipe is a card-present transaction where a customer slides a card having a magnetic strip through a payment reader that captures payment data contained in the magnetic strip. A dip is a card-present transaction where a customer inserts a card having an embedded microchip (i.e., chip) into a payment reader chip-side first. The card remains in the payment reader until the payment reader prompts the customer to remove the card. While the card is in the payment reader, the microchip creates a one-time code which is sent from the POS reader to a server associated with a payment processing service, a bank, and/or a card payment network (e.g., Mastercard, VISA, etc.) to be matched with an identical one-time code. A tap is a card-present transaction where a customer may tap or hover his or her electronic device such as a smart phone running a payment application over a payment reader to complete a transaction via short-range communication (e.g., NFC, RFID, Bluetooth®, BLE, etc.). Short-range communication enables the electronic device to exchange information with the payment reader. A tap may also be called a contactless payment. In some countries, a customer may engage in a tap using a TAP card instead of an electronic device.

The phrases "in some examples," "according to various examples," "in the examples shown," "in one example," "in other examples," "various examples," "some examples," and the like generally mean the particular feature, structure, or characteristic following the phrase is included as at least one example, and may be included in more than one example without specifically being referred to as such. In addition, such phrases do not necessarily refer to the same examples or to different examples.

If the specification states a component or feature "may," "can," "could," or "might" be included or have a characteristic, that particular component or feature is not required to be included or have the characteristic.

The preceding summary is provided for the purposes of summarizing some examples to provide a basic understanding of aspects of the subject matter described herein. Accordingly, the above-described features are merely examples and should not be construed as limiting in any way. Other features, aspects, and advantages of the subject matter described herein will become apparent from the following description of Figures and Claims.

FIG. 1 illustrates one example of credit card processing reader 100 such as a point-of-sale (POS) reader for on-premises credit card payments. Such readers typically meet industry requirements if used for processing Visa, Master-card, American Express, JCB or Discover payments. The security standards are set by the Payment Card Industry Security Standards Council (PCI SSC), which also sets standards for personal identification number (PIN) transaction security (PTS). One of the security standards set is the Payment Card Industry Data Security Standard (PCI DSS). Other security standards are set by a European subgroup of the Joint Interpretation Library (JIL) working group, called the JIL Terminal Evaluation Methodology Subgroup, or JTEMS. The standards serve to protect against fraud and provide for secure entry and transmission of PIN and account data. POS terminals and readers are used in the retail, restaurant, entertainment, healthcare, and service industries, to name a few.

Reader 100 may be a standalone device, or it may be mounted within or on to a cradle, bracket or other holder (not illustrated) and interface through port 102. Port 102 may be any type of serial or parallel communication port, for example a universal serial bus (USB), or any other type of interface. In one example port 102 may be used to provide power to reader 100. In one example port 102 may be used for communication and power to reader 100. Other communication options for reader 100 are discussed below. On the side of reader 100 that is opposite port 102 is a slot (not visible in FIG. 1) into which a credit card may be inserted and read by a payment reader (not illustrated in FIG. 1). This describes a dip, but it should be understood that both a tap and a swipe are both included as potential transaction methods with an appropriately configured terminal, for example with near field communications (NFC). An NFC antenna (not shown in FIG. 1) may be located behind, for example, a display and enable interaction with other NFC devices. Display 104 may be any type of emissive or reflective display, or a combination thereof, for example LED, LCD, OLED, MEMS, ELD, QLED, etc. Additionally display 104 may be touch sensitive such that a user may interact with images present on display 104. Such interactions include viewing an amount to be charged to a card, transaction description, entry or selection of amounts for gratuity, signature input, transaction approval, and so on. Button 106 activates reader 100 and may be used to power down, power up, place reader 100 into a sleep/standby mode or awaken reader 100 from a sleep/standby mode.

Figure 2:
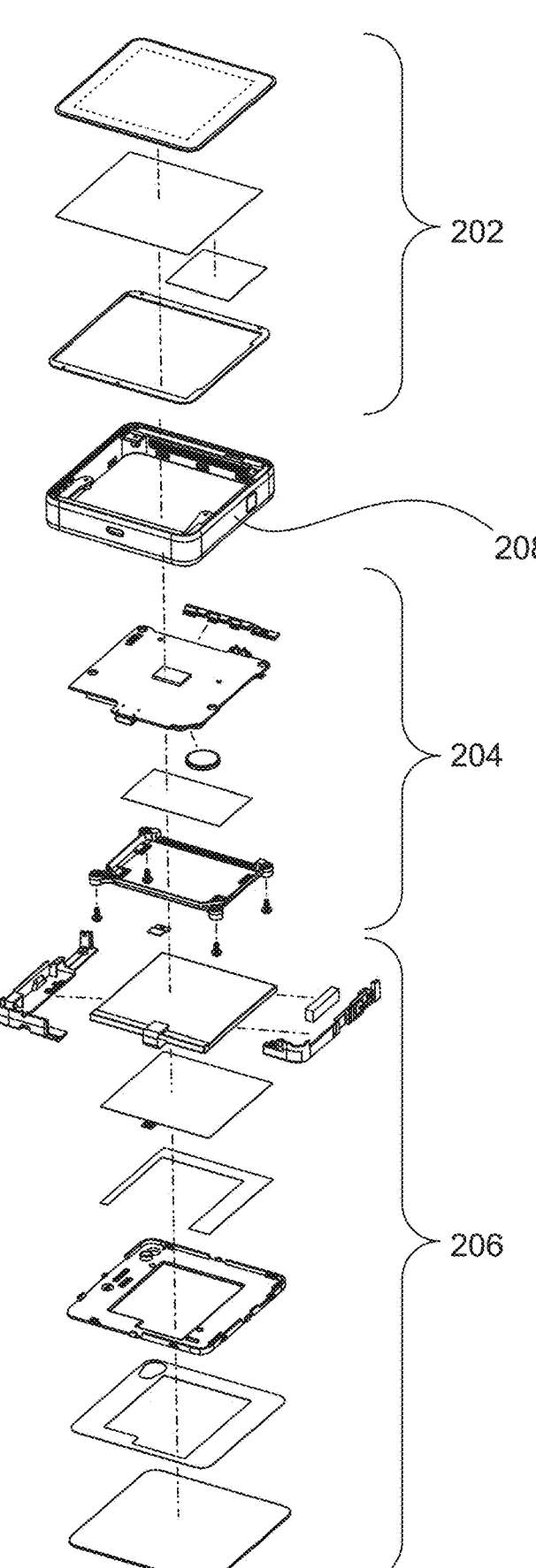
FIG. 2 is an exploded parts diagram illustrating one example of a credit card reader.

FIG. 2 is an exploded parts diagram illustrating one example of credit card processing reader 100. The illustrated parts are broadly grouped into three groups plus a structural component. The groups are communications assembly 202, secure circuit assembly 204 and rear assembly 206. Frame 208 is the structural component. The naming convention with respect to each group is in no way limiting to that group or any other group, for example communications assembly 202 may include more than just communication components, or secure circuit assembly 204 does not mean or imply that other groups are not secure, or that communications may be engaged by rear assembly 206, to name a few examples.

The assembly of reader 100 may be completed by collapsing the parts illustrated in FIG. 2, with communications assembly 202 attaching to the topmost section of frame 208, then secure circuit assembly 204 inserting within frame 208 and underneath communications assembly 202, with rear assembly inserting within frame 208 and under secure circuit assembly 204. This top-down orientation is maintained in FIG. 3, but reversed in FIGS. 4 and 5.

Figure 3:
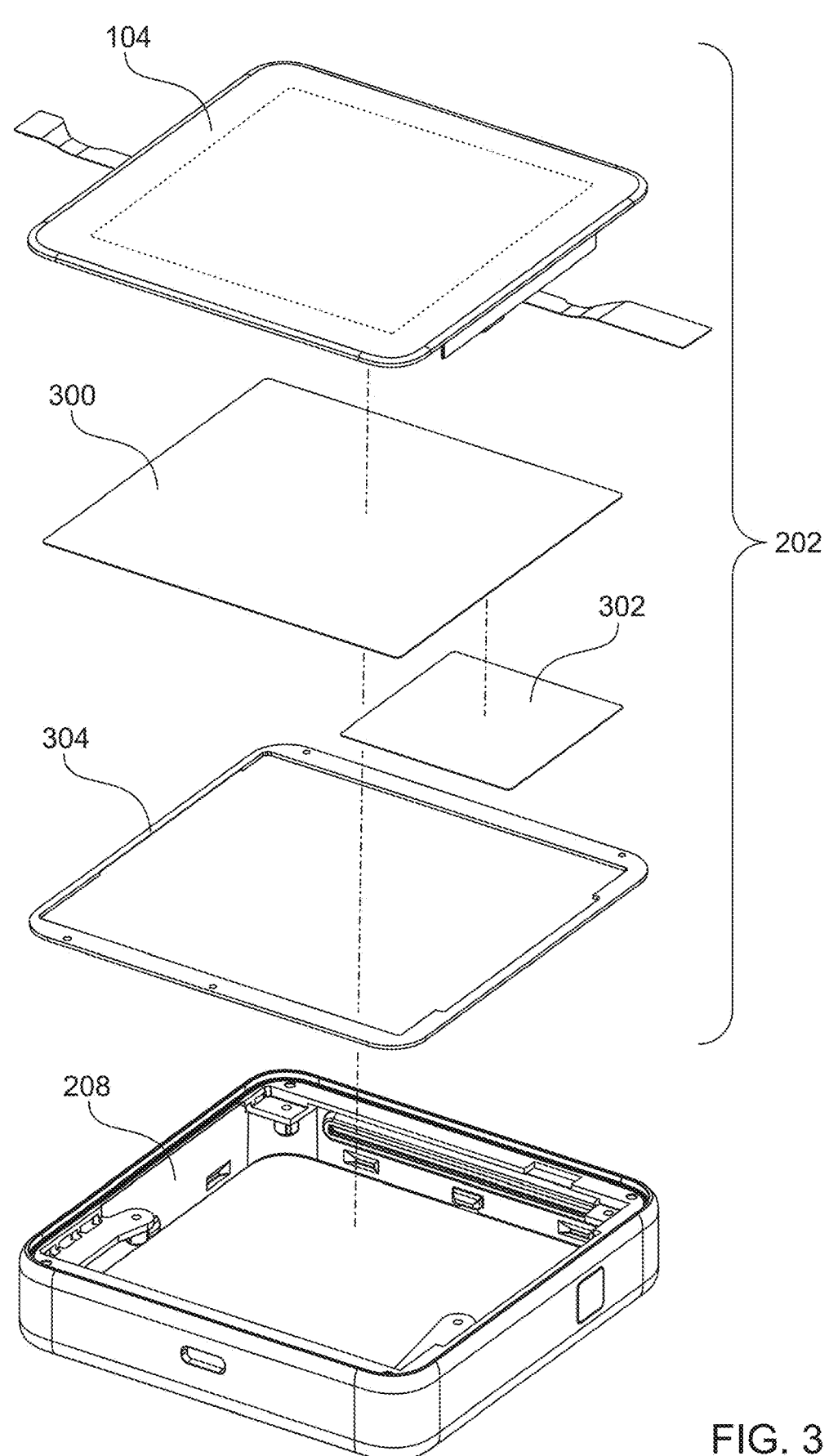
FIG. 3 is a partial exploded parts diagram illustrating one example of a communications assembly from a credit card reader.

FIG. 3 is a partial exploded parts diagram illustrating communications assembly 202 from FIG. 2 in a top-down orientation, as well as frame 208. Communications assembly 202 includes display 104 as previously described with respect to FIG. 1. Also included in communications assembly 202 is shield 300, reflector 302 and antennae 304. Shield 300 attenuates electromagnetic impulses between display 104 and antenna 304, as well as secure circuit assembly 204.

Shield 300 may be useful in reducing losses that occur from metal parts that are on the other side of shield 300 from display 104 (e.g. the PCB, the battery-conductive material that is near shield 300) reducing interference of communications and circuit processing by display 104. Shield 300 may be made from ferrite or other suitable shielding material for short range attenuation, for example NiZn, MnZn, etc.

Figure 5:
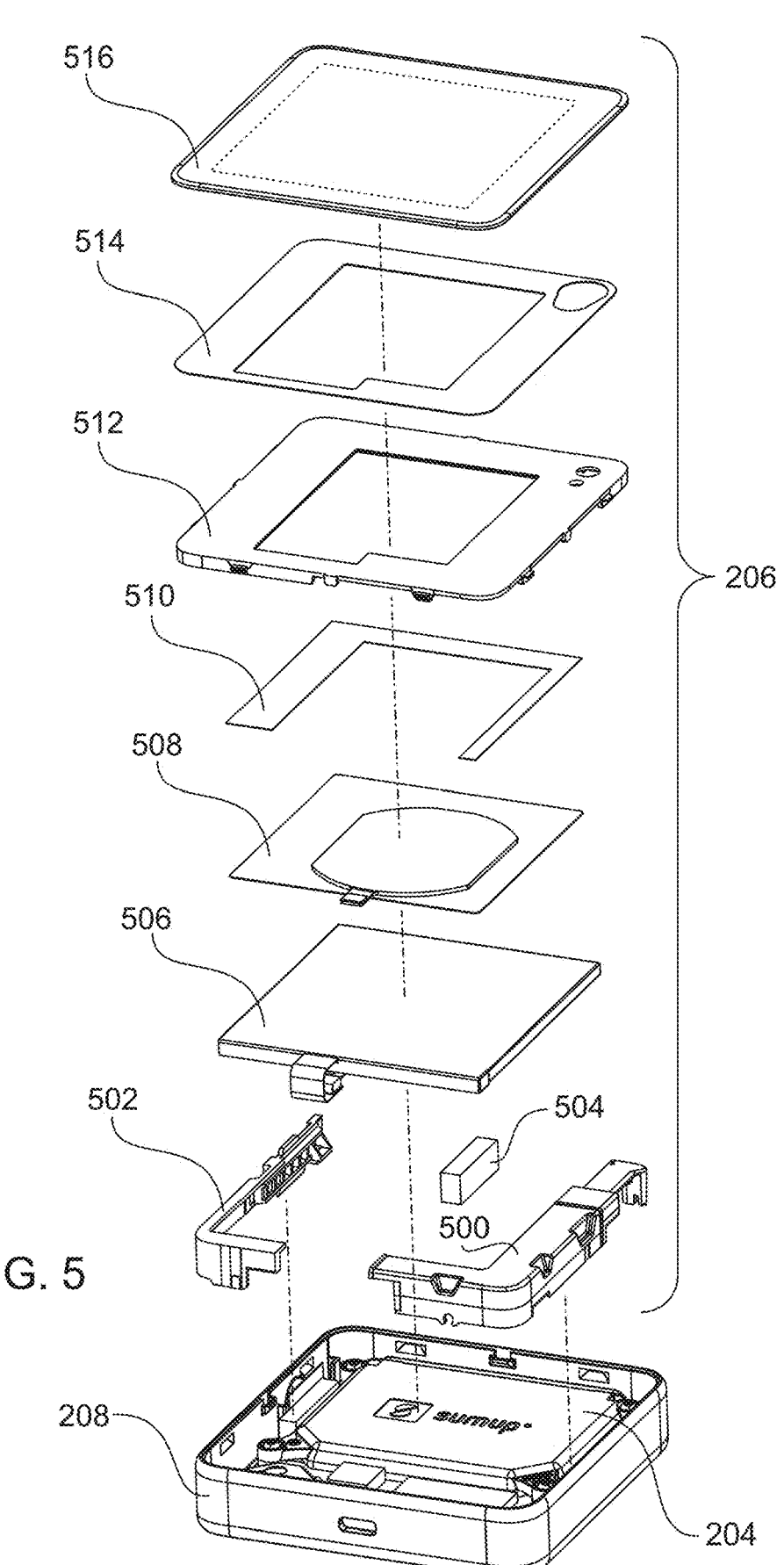
FIG. 5 is a partial exploded parts diagram illustrating one example of a rear assembly from a credit card reader.

Reflector 302 reduces efficiency losses that otherwise would occur for the cellular antenna (see FIG. 5). Reflector 302 may be made of a metal, for example copper, aluminum or steel.

Antennae 304 in this example may be a near field communication (NFC) antenna. NFC is based on inductive coupling between two antennas present on NFC-enabled devices, for example a POS credit card processing reader and a credit card. An NFC system can be used for communicating in one or both directions, using a frequency of 13.56 MHz. One practice of providing a small form factor for a POS reader is by placing a communication coil used by the NFC system in close proximity to the readout display of the processing device. Because of the proximity of the coil and display, operating aspects of the display may cause distortion of the waveforms from the NFC system.

Frame 208 provides structural support and integrity to reader 100 and may be made from injection molded plastic or any other suitable material and manufacturing method. From the perspective shown in FIG. 3, communications assembly 202 stack together near the top of frame 208 once pressed into place.

Figure 4:
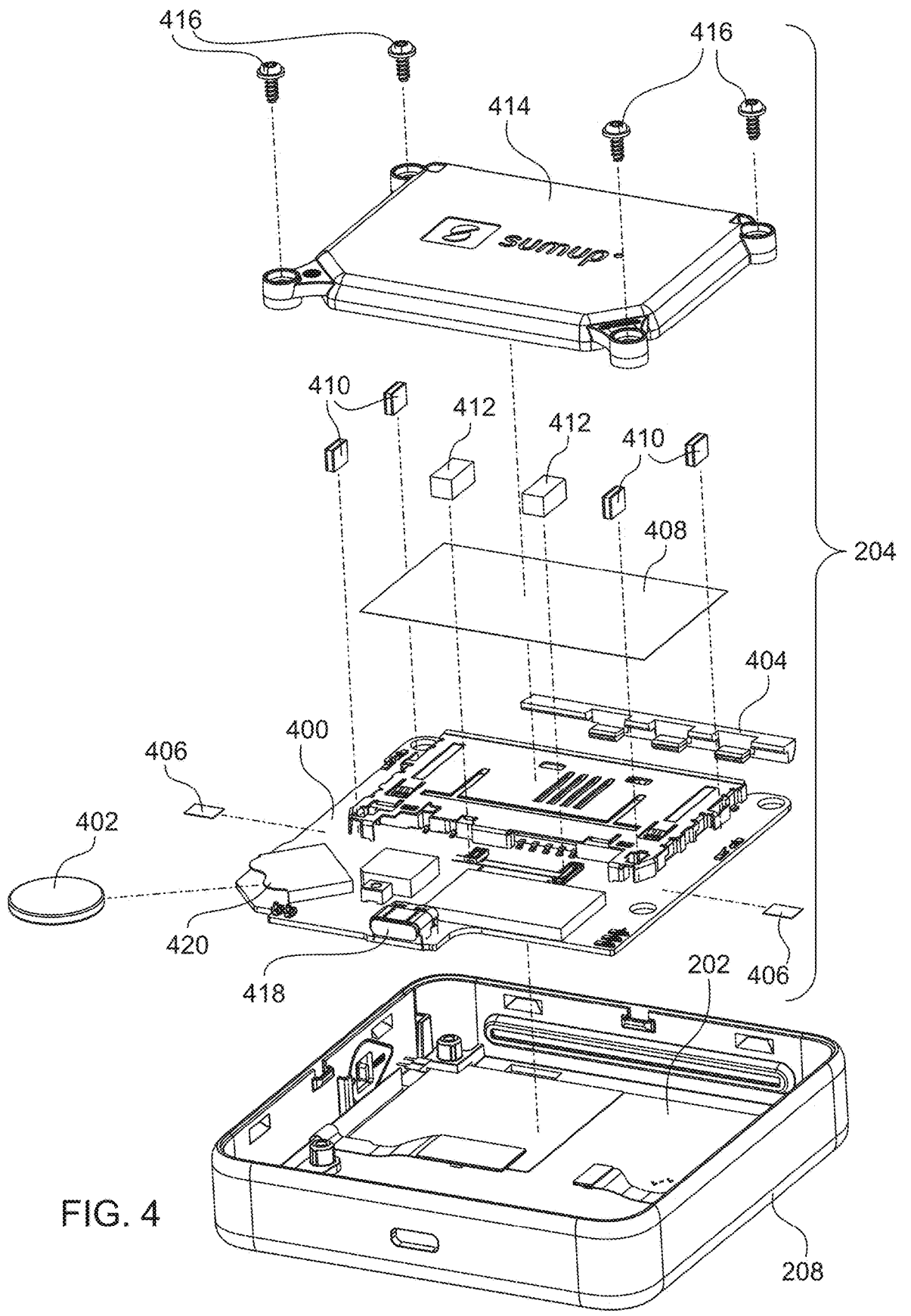
FIG. 4 is a partial exploded parts diagram illustrating one example of a secure circuit assembly from a credit card reader.

FIG. 4 is a partial exploded parts diagram illustrating secure circuit assembly 204 from FIG. 2 in a bottom-down orientation, as well as frame 208 and communications assembly 202. FIG. 4 is in the reverse orientation of FIG. 3, such that communications assembly 202 is pictured at the bottom of frame 208. Secure circuit assembly 204 includes printed circuit board (PCB) 400, battery 402, card guide 404, conductive tape 406, seal tape card connector 408, tamper switches 410, foam display cables 412, cover 414 and screws 416.

PCB 400 includes connector 418 (accessed through port 102), battery bracket 420, conductive LCD tape 406, seal tape card connector 408 to help reduce shorting issues, and foam spacers 412.

In a POS credit-card processing terminal or reader, secure covers and anti-tamper rubber switches are commonly used to pass penetration tests that verify the resistance of the reader against physical attack methods. Secure covers may have grabbers (also referred to as ribs) (not illustrated in FIG. 4) into which conductive rubber blocks are pressed to form a bridge between electrical pads. In one example, the conductive rubber blocks may be zebra connectors, or tamper switches 410. Electrical pads (not illustrated in FIG. 4) are respectively connected to electrical traces (not illustrated in FIG. 4) and are located on PCB 400. When cover 414 is tightened onto PCB 400 with screws 416, the resistance of tamper switches 410 changes until it is within a determined range. Once reader 100 is in use, if a change in resistance is detected with respect to the circuit connected to tamper switches 410, that is outside the determined range, then reader 100 registers that change as a tamper attempt and reader 100 may be blocked or disabled. Once activated, removing cover 414 dislodges tamper switches 410, causing a change in resistance across the electrical contacts and triggering a tamper attempt. Drilling into cover 414 and connecting a trace from one of the electrical pads, to a trace from another electrical pad (creating a short circuit), also causes a change in resistance and triggers a tamper attempt. This is one example of security for secure circuit assembly 204.

Battery 402 provides backup power for data retention in volatile memory in case of power loss as well as providing continuous power to security sensors. Card guide 404 assists in guiding a credit card at a proper place and angle into reader 100.

FIG. 5 is a partial exploded parts diagram illustrating rear assembly 206 from FIG. 2 in a bottom-down orientation, as well as frame 208 and secure circuit assembly 204. FIG. 5 is in the reverse orientation of FIG. 3, such that communications assembly 202 (not illustrated in FIG. 5) is at the bottom of frame 208, with secure circuit assembly 204 shown on top of communications assembly 202 and inside of frame 208. Rear assembly 206 includes communications assembly 500, button support assembly 502, foam button support 504, battery 506, wireless charging pad 508, adhesive 510, rear support 512, adhesive 514, rear panel 516.

Communications assembly 500 may connect to PCB 400 and provide additional communication capability, for example one or more of the following: cellular, Bluetooth, Bluetooth LE, Wi-Fi, Zigbee, infrared, near field (NFC), etc. Button support assembly 502 and foam button support 504 in conjunction serve as button 106 (see FIG. 1) for power and sleep operations. Button support assembly 502 may connect to PCB 400. Battery 506 provides power to reader 100 and may be rechargeable or non-rechargeable. Examples of rechargeable battery types include lead-acid, nickel-cadmium (NiCd), nickel-metal hydride (NiMH), lithium-ion (Li-ion), lithium-ion polymer (LiPo), and rechargeable alkaline batteries. Wireless charging pad 508 may recharge battery 506 through wireless inductive charging. A magnetic loop antenna (copper coil) is used to create an oscillating magnetic field, which can create a current in one or more receiver antennas in wireless charging pad 508. This current may be used to recharge battery 506. Rear support 512 is bonded to wireless charging pad 508 with adhesive 510. Rear panel 516 is bonded to rear support 512 with adhesive 514. Rear panel 516 may be made from any suitable material, for example metal, glass, plastic, etc.

Figure 6:
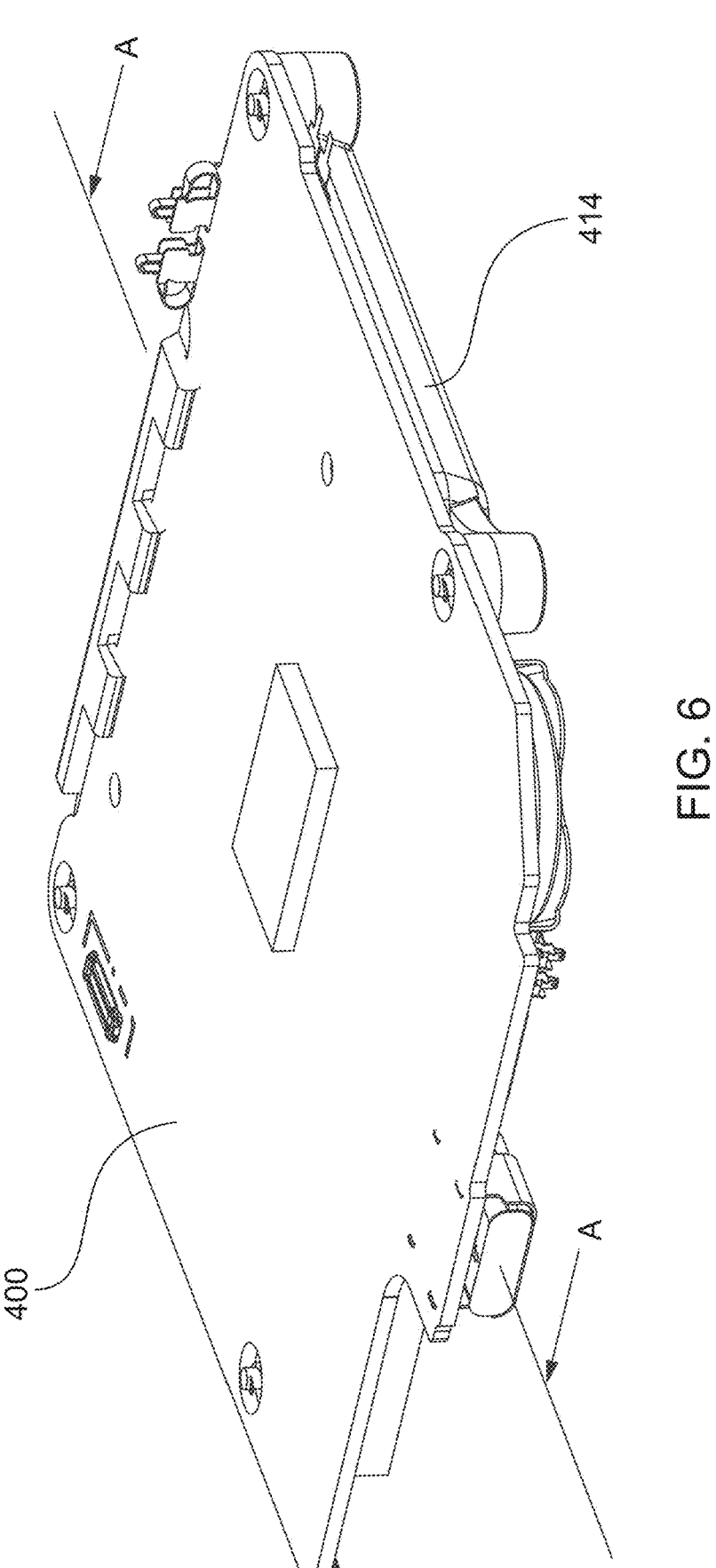
FIG. 6 is a bottom perspective view illustrating a printed circuit board from a credit card reader.

FIG. 6 is a bottom perspective view illustrating printed circuit board 400 from credit card reader 100 (see FIG. 1). The view of PCB 400 illustrated in FIG. 6 is from the same side as that illustrated in FIG. 2, opposite the side of PCB 400 with cover 414 attached. In one aspect, PCB 400 is a multi-layer stack-up, including such layers as ground planes, signal planes and power planes. PCB 400 may be an eight layer stack-up with a 2-4-2 configuration or a 3-2-3 configuration. PCB 400 may have fewer or more layers, and PCB 400 may have different configurations. PCB 400 may have vias (not illustrated in FIG. 6) that extend through PCB 400 from the side visible in FIG. 6 to the opposite side, onto which cover 414 is attached. Integrated circuit (IC) 600 may be attached to PCB 400. IC 600 may be any type of integrated circuit, for example a microprocessor, an application specific integrated circuit (ASIC), a digital signal processor (DSP), a field programmable gate array (FPGA), or memory, or graphics, digital, analog, etc. There may be multiple chips and integrated circuits on PCB 400 and not illustrated in FIG. 6. Using space on the side of PCB 400 illustrated in FIG. 6 reduces the need for a larger PCB, if security guidelines can still be followed. Rather than place more circuits on the side of PCB 400 that is protected by cover 414, secure circuits or secure processors may be placed outside that area.

Credit card authorization devices, for example readers and terminals, have security features that are standardized through the PCI SSC. One of the security measures is enclosing sensitive components inside a mesh consisting of multiple electrical traces. The traces making up the mesh are monitored by security systems in the device. The traces have a prescribed size limit and spacing from one another, creating a mesh web (mesh) that is difficult to penetrate without either severing one of the traces (creating an open circuit) or bridging two adjacent traces (creating a short circuit), either event being interpreted as a tamper attempt and resulting in security measures, for example disabling the device. One security measure places sensitive components between security meshes. In a multi-layer PCB such as PCB 400, one of the layers may include mesh. Another layer may be in or on a cover, for example cover 414. Components between the mesh layer in PCB 400 and cover 414 would be surrounded on two sides by mesh, therefore meeting one of the security requirements of PCI SSC. Mesh includes electrically active conductive traces (not illustrated in FIG. 7) that may be a part of the security for reader 100.

Some sensitive components are excepted from the mesh constraints outlined in the PCI SSC, for example a secure processor. A secure processor may have some combination of die mesh, tamper sensors (for example, voltage, temperature, frequency, etc.), and package configuration to be considered "secure." A secure processor may or may not be "pre-certified" according to PCI SSC guidelines. A secure microprocessor or other secure integrated circuit is treated under the PCI SSC as a security layer, such that if there is a sensitive component with a mesh layer adjacent to it on one side and a secure processor adjacent to it on the opposite side, the standard has been met with respect to that guideline, where otherwise a mesh layer would need to have been on both sides of the sensitive component (for example, above and below, but not necessarily to either side and along the plane of the component). Reference throughout the description to processor or microprocessor is made, however any secure chip (integrated circuit) can be substituted for the purpose of replacing mesh as a security layer (for example, the NFC chip, a PGA, memory, etc.).

Figure 7:
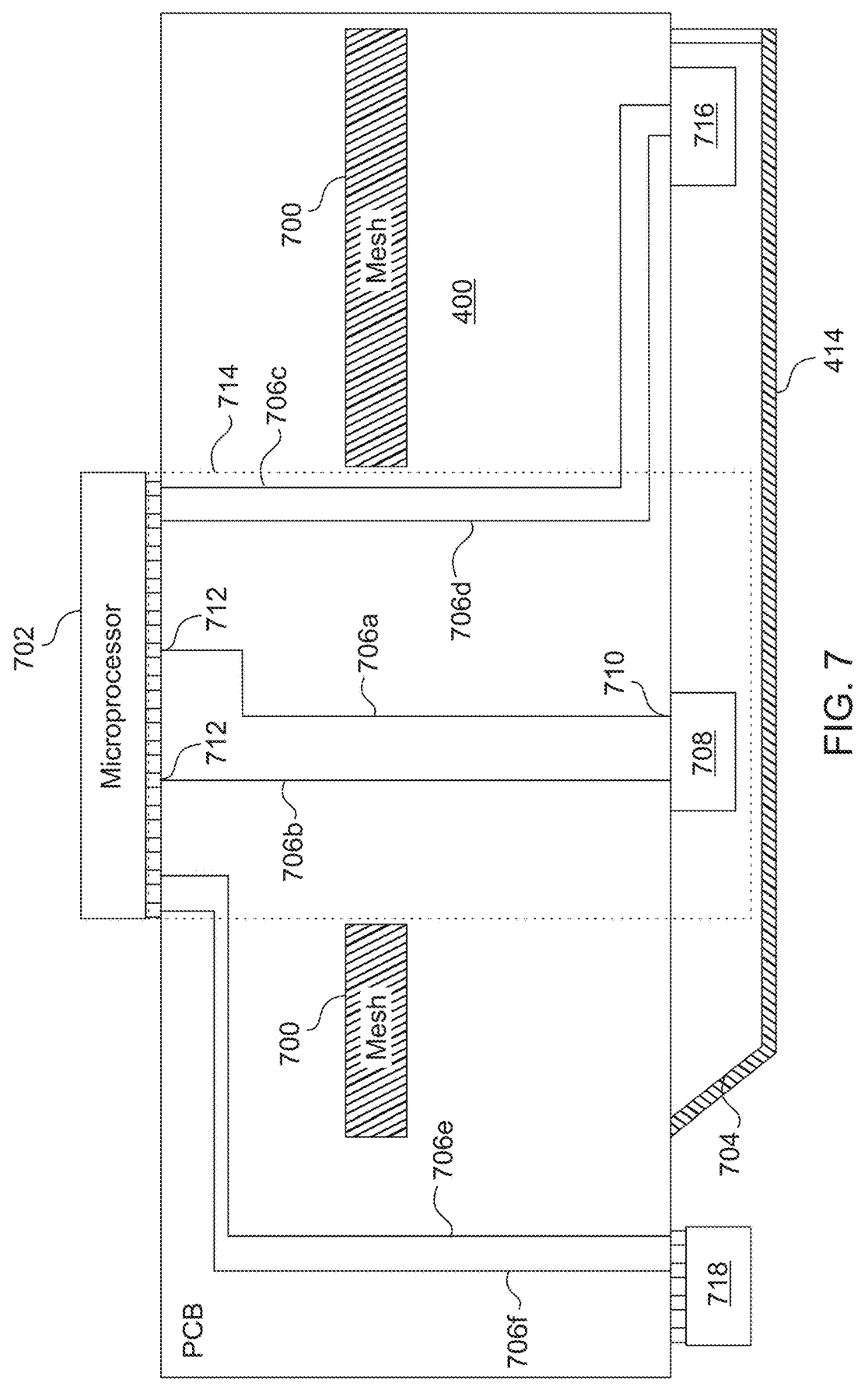
FIG. 7 is a partial cross-sectional view through line A-A of FIG. 6 illustrating one aspect of a printed circuit board and relative electrical component positions with respect to mesh.

FIG. 7 is a partial cross-sectional view through line A-A of FIG. 6 illustrating one aspect of a printed circuit board and relative electrical component positions with respect to mesh. In one aspect, PCB 400 is an eight layer stack-up with one of the layers including mesh 700. Microprocessor 702 is connected to the top of PCB 400 and cover 414 is connected to the bottom. Cover 414 may include mesh 704, with a plurality of electrical traces making up mesh 704 and monitored for tamper attempts. Vias 706*a*, 706*b*, 706*c*, 706*d*, 706*e* and 706*f* (collectively referred to as vias 706) extend through PCB 400 from the top to the bottom. The use of "top" and "bottom" is by illustration according to all of these FIGs. and throughout the description, for the purpose of having a common reference. The "top" of PCB 400 is the side of PCB 400 on which microprocessor 702 is connected (or as later described, an integrated circuit). The "bottom" of PCB 400 is the side of PCB 400 to which cover 414 is attached. Any directionality with respect to vias or manufacturing is for common reference, rather than implying any type of process step. A via may be established with a laser, a drill, chemically etched, or by other means. A via may go straight through a printed circuit board, or it may connect to an intermediate layer and continue along a conductive line with the printed circuit board and then turn and exit out the side opposite where it started. Referencing a via as taking a non-straight path (for example, describing that a via traverses through the PCB from one side to the other, or from top to bottom, or bottom to top, in a line having a several turns, such that the via is not perpendicular to the plane of the PCB throughout its entire length) includes multiple vias extending into a PCB and connected to one another through an intermediary conductive layer. In this example, multiple vias electrically connected by an intermediate layer may be considered a "via." One advantage to establishing vias in the footprint of a secure processor or secure integrated circuit is that the vias may be made with a less expensive process such as by drilling, as opposed to a laser. A drilled via is larger than a lasered via, and may be used in parts of PCB 400 that are either not secure or that are secured by other means (for example mesh). Other aspects of the configuration include reduced mesh size (because some of the security is provided by a secure processor) and reduced PCB size (by mounting a secure integrated circuit on top of the PCB as compared to mounting it on the bottom and underneath the cover.

Via 706*a* extends down from the top of PCB 400, connects to an intermediate layer and turns to be parallel with the plane of PCB 400, then turns again toward the bottom and exits. Via 706*b* is an example of a via that goes straight through PCB 400 without turning. Vias 706*a* and 706*b* electrically connect microprocessor 702 with electrodes 708. One of electrodes 708 may be secure card (SC) pin 710, which is connected to input/output (I/O) pin 712 of microprocessor 702 through via 706*a*. SC pin 710 may access data from credit cards inserted into reader 100 during a credit card transaction. SC pin 710 is a sensitive component that is protected under PCI SSC guidelines, which would have two layers of mesh on either side of SC pin 710, or a layer of mesh on one side and a secure processor on the other side. In one aspect, mesh 704 from cover 414 is below electrodes 708 and SC pin 710, and above them is microprocessor 702. In one aspect, microprocessor 702 is a secure processor under the guidelines of PCI SSC, and therefore SC pin 710 is also secure under those guidelines, despite not being under mesh 700. In the aspect of microprocessor 702 being a secure microprocessor, the "footprint" under microprocessor 702 is considered protected from at least the side of PCB 400 on which microprocessor 702 is mounted. The area under microprocessor 702, footprint 714, can be understood by drawing a boundary line around the border of microprocessor 702, the line perpendicular to microprocessor 702 and extending down through PCB 400 and including electrodes 708.

Another component, device 716, is not within footprint 714. Device 716 has on one side mesh 704 and on the opposite side mesh 700. Vias 706*c* and 706*d*, which connect device 716 with microprocessor 702, extend from microprocessor 702 through footprint 714 and then turn and continue between mesh 700 and 704, to device 716. Device 716 could be considered protected according to PCI SSC guidelines because of the two layers of mesh around it and because vias 706*c* and 706*d* are entirely within protected space, either between mesh 700 and 704, or between mesh 704 and within footprint 714.

Vias 706*e* and 706*f* connect other I/O pins of microprocessor 702 with device 718. Although vias 706*e* and 706*f* originate within footprint 714, their path traverses outside of footprint 714 and not within a protected space, making them less secure than vias 706*a-d*. Device 718 is positioned on the bottom of PCB 400 and outside of protected areas.

In one aspect, footprint 714 is bordered on all four sides by mesh 700. By geometry, microprocessor 702 being rectangular or square in shape, footprint 714 has four sides. Two sides of mesh 700 are evident in FIG. 7. In one aspect, all of mesh 700 is outside of footprint 714. Mesh 704 from cover 414 may have roughly the same surface area as mesh 700 added to the surface area of microprocessor 702. Mesh 704 may have a slightly larger surface area because of the sidewalls of cover 414.

Figure 8:
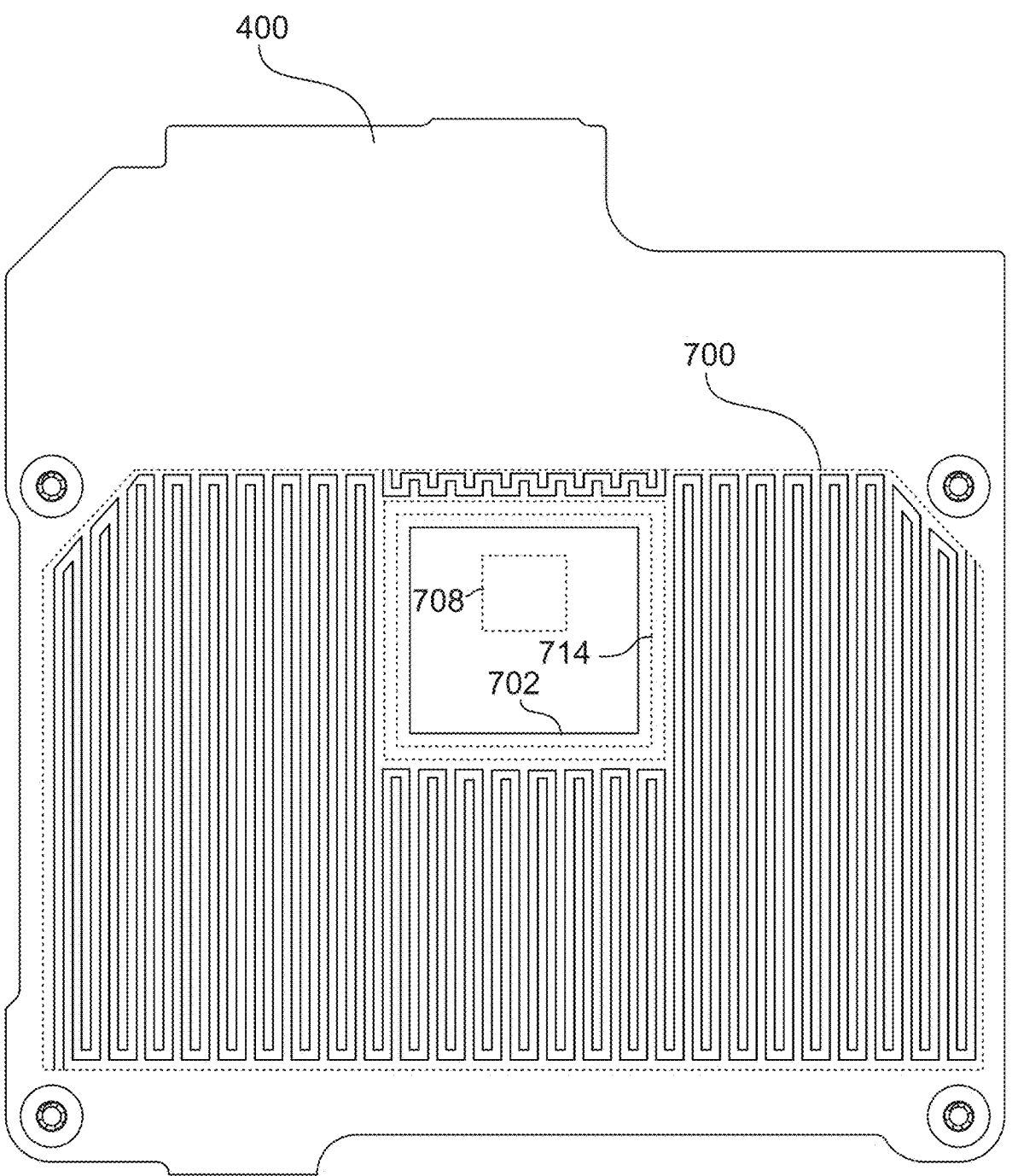
FIG. 8 is a plan view with a dimensional overlay illustrating one aspect of a printed circuit board and relative electrical component positions with respect to mesh as illustrated in FIG. 7.

FIG. 8 is a top-down plan view with a dimensional overlay illustrating one aspect of a printed circuit board and relative electrical component positions with respect to mesh as illustrated in FIG. 7. PCB 400 is illustrated from the top with microprocessor 702. Not on the surface of PCB 400 but illustrated to provide perspective on the relative relationship, is mesh 700 with electrical traces. Mesh 700 is in a mid-layer beneath the surface of PCB 400 (as illustrated in FIG. 7), but is illustrated in FIG. 8 to show the positional relationship with footprint 714. Footprint 714 is defined by the border of microprocessor 702 and extends down through PCB 400, or into the page of FIG. 8. In one aspect, footprint 714 has no overlap with mesh 700 and is surrounded by mesh 700 on all four sides, as illustrated. Electrodes 708 (on the bottom of PCB 400, as illustrated in FIG. 7) are illustrated for their position relative to microprocessor 702, footprint 714 and mesh 700. Not specifically illustrated in FIG. 8 but part of electrodes 708 is SC pin 710. The electrical traces in mesh 700 may have a spacing of 150 micrometers between traces. In one aspect, all traces throughout mesh 700 may have a spacing of no more than 150 micrometers. In one aspect, the width of the traces may be no more than 150 micrometers, or no more than 100 micrometers, or no more than 50 micrometers, or no more than 250 micrometers, or no more than 200 micrometers.

Figure 9:
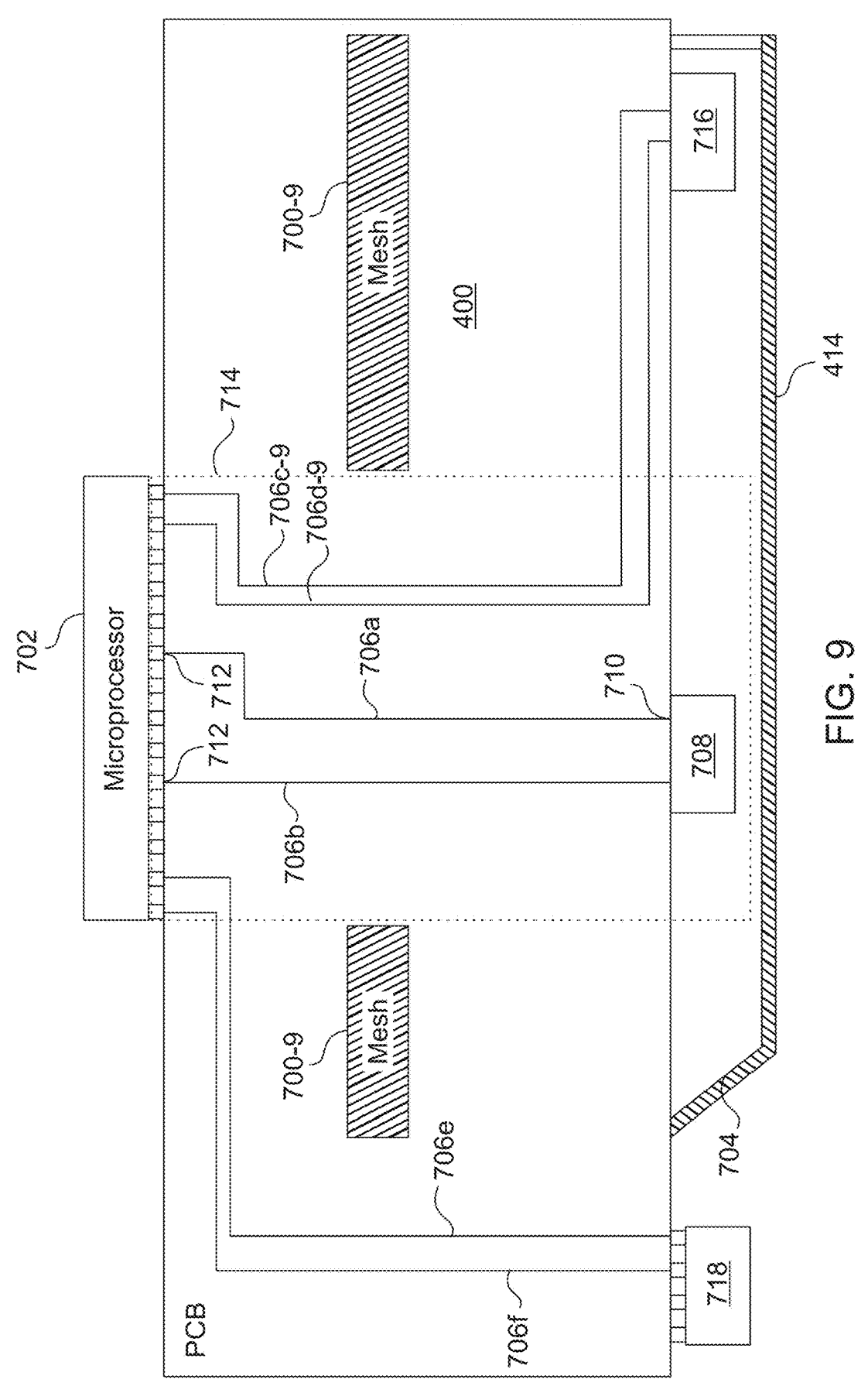
FIG. 9 is a partial cross-sectional view through line A-A of FIG. 6 illustrating one aspect of a printed circuit board and relative electrical component positions with respect to mesh.

FIG. 9 is a partial cross-sectional view through line A-A of FIG. 6 illustrating one aspect of a printed circuit board and relative electrical component positions with respect to mesh. In one aspect, PCB 400 is an eight layer stack-up with one of the layers including mesh 700-9. Microprocessor 702 is connected to the top of PCB 400 and cover 414 is connected to the bottom. Cover 414 may include mesh 704, with a plurality of electrical traces making up mesh 704 and monitored for tamper attempts. Vias 706*a*, 706*b*, 706*c-9*, 706*d-9*, 706*e* and 706*f* (collectively referred to as vias 706) extend through PCB 400 from the top to the bottom. See description for FIG. 7 with respect to "top" and "bottom" orientation, PCB 400 and vias.

Via 706*a* extends down from the top of PCB 400, connects to an intermediate layer and turns to be parallel with the plane of PCB 400, then turns again toward the bottom and exits. Via 706*b* is an example of a via that goes straight through PCB 400 without turning. Vias 706*a* and 706*b* electrically connect microprocessor 702 with electrodes 708. One of electrodes 708 may be secure card (SC) pin 710, which is connected to input/output (I/O) pin 712 of microprocessor 702 through via 706*a*. SC pin 710 may access data from credit cards inserted into reader 100 during a credit card transaction. SC pin 710 is a sensitive component that is protected under PCI SSC guidelines, which would have two layers of mesh on either side of SC pin 710, or a layer of mesh on one side and a secure processor on the other side. In one aspect, mesh 704 from cover 414 is below electrodes 708 and SC pin 710, and above them is microprocessor 702. In one aspect, microprocessor 702 is a secure processor under the guidelines of PCI SSC, and therefore SC pin 710 is also secure under those guidelines, despite not being under mesh 700-9. In the aspect of microprocessor 702 being a secure microprocessor, the "footprint" under microprocessor 702 is considered protected from at least the side of PCB 400 on which microprocessor 702 is mounted. The area under microprocessor 702, footprint 714, can be understood by drawing a boundary line around the border of microprocessor 702, the line perpendicular to microprocessor 702 and extending down through PCB 400 and including electrodes 708.

Another component, device 716, is not within footprint 714. Device 716 has on one side mesh 704 and on the opposite side mesh 700-9. Vias 706c-9 and 706d-9, which connect device 716 with microprocessor 702, extend from microprocessor 702 into footprint 714 turn to avoid a portion of mesh 700-9 that extends into footprint 714, continue through PCB 400, turn again near the bottom of PCB 400, continue between mesh 700-9 and 704, and turn down to device 716. Device 716 could be considered protected according to PCI SSC guidelines because of the two layers of mesh around it and because vias 706c-9 and 706d-9 are entirely within protected space, either between mesh 700-9 and 704, or between mesh 704 and within footprint 714.

Vias 706e and 706f connect other I/O pins of microprocessor 702 with device 718. Although vias 706e and 706f originate within footprint 714, their path traverses outside of footprint 714 and not within a protected space, making them less secure than via 706a, for example. Device 718 is positioned on the bottom of PCB 400 and outside of a protected area.

In one aspect, footprint 714 is bordered on all four sides by mesh 700-9. By geometry, microprocessor 702 being rectangular or square in shape, footprint 714 has four sides. Two sides of mesh 700-9 are evident in FIG. 7. In one aspect, part of mesh 700-9 overlaps with footprint 714. Mesh 704 from cover 414 may have roughly the same surface area as mesh 700-9 added to the surface area of microprocessor 702, depending on the amount of overlap between mesh 700-9 and footprint 714. Mesh 704 may have a lower surface area, depending on the amount of overlap between mesh 700-9 and footprint 714.

Figure 10:
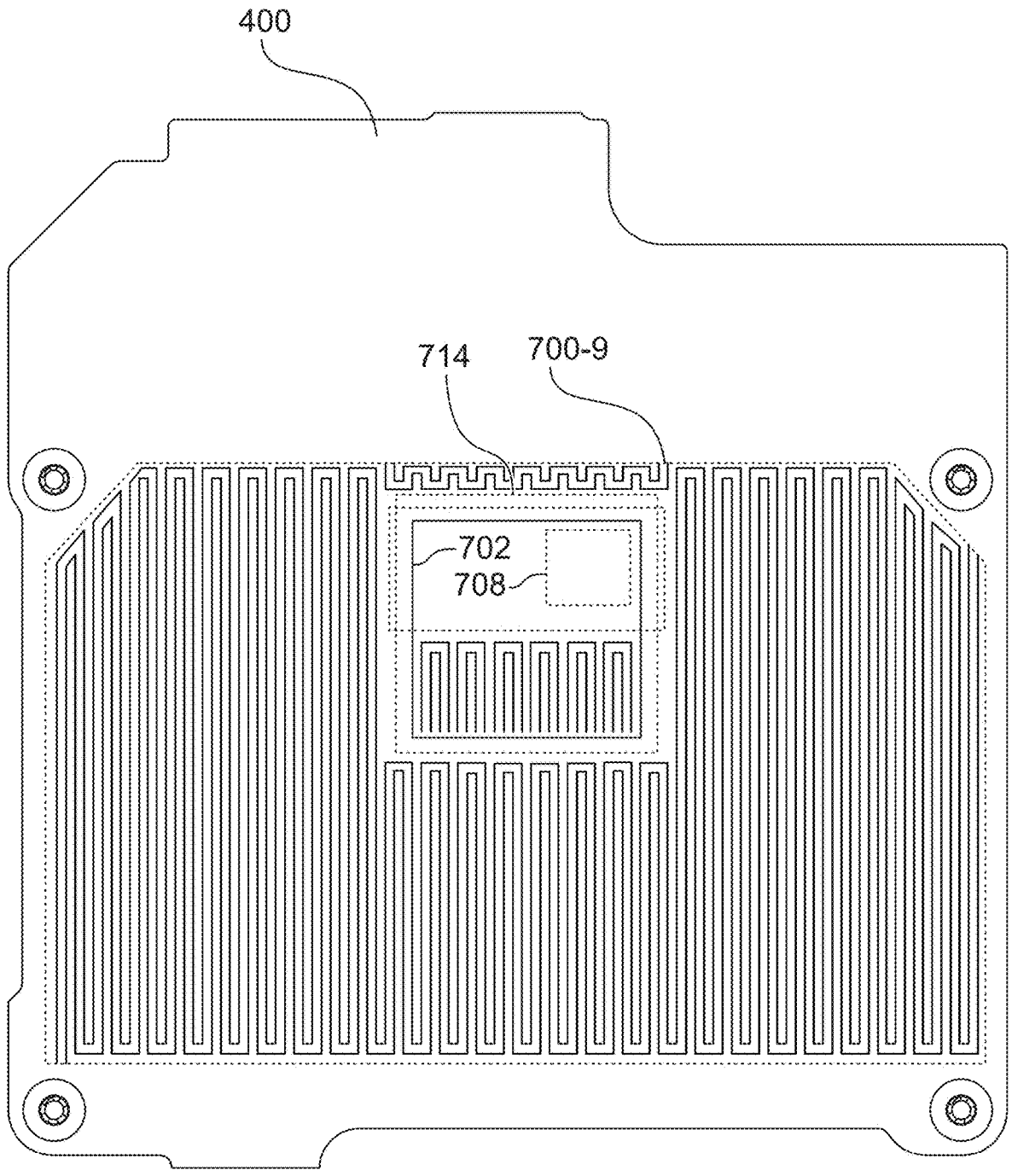
FIG. 10 is a plan view with a dimensional overlay illustrating one aspect of a printed circuit board and relative electrical component positions with respect to mesh as illustrated in FIG. 9.

FIG. 10 is a top-down plan view with a dimensional overlay illustrating one aspect of a printed circuit board and relative electrical component positions with respect to mesh as illustrated in FIG. 9. PCB 400 is illustrated from the top with microprocessor 702. Not on the surface of PCB 400 but illustrated to provide perspective on the relative relationship, is mesh 700-9 with electrical traces. Mesh 700-9 is in a mid-layer beneath the surface of PCB 400 (as illustrated in FIG. 9), but is illustrated in FIG. 10 to show the positional relationship with microprocessor 702. Footprint 714 is defined by the border of microprocessor 702 and extends down through PCB 400, or into the page of FIG. 10. In one aspect, footprint 714 has overlap with mesh 700-9 and is surrounded by mesh 700-9 on all four sides, as illustrated in FIG. 10. Electrodes 708 (on the bottom of PCB 400, as illustrated in FIG. 9) are illustrated for their position relative to microprocessor 702 and mesh 700-9. Not specifically illustrated in FIG. 10 but part of electrodes 708 is SC pin 710.

Figure 11:
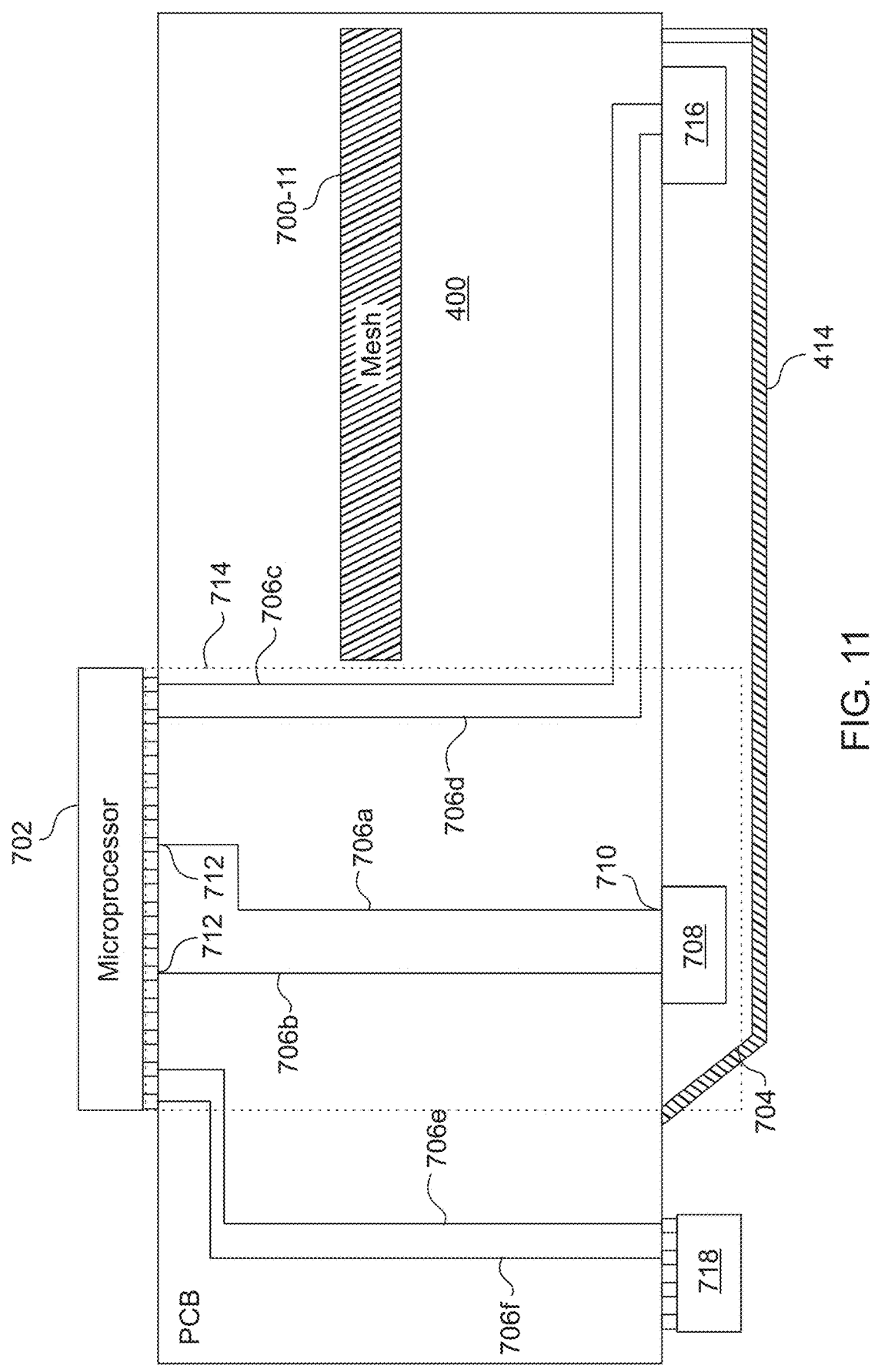
FIG. 11 is a partial cross-sectional view through line A-A of FIG. 6 illustrating one aspect of a printed circuit board and relative electrical component positions with respect to mesh.

FIG. 11 is a partial cross-sectional view through line A-A of FIG. 6 illustrating one aspect of a printed circuit board and relative electrical component positions with respect to mesh. In one aspect, PCB 400 is an eight layer stack-up with one of the layers including mesh 700-11. Microprocessor 702 is connected to the top of PCB 400 and cover 414 is connected to the bottom. Cover 414 may include mesh 704, with a plurality of electrical traces making up mesh 704 and monitored for tamper attempts. Vias 706a, 706b, 706c, 706d, 706e and 706f (collectively referred to as vias 706) extend through PCB 400 from the top to the bottom. See description for FIG. 7 with respect to "top" and "bottom" orientation, PCB 400 and vias.

Via 706a extends down from the top of PCB 400, connects to an intermediate layer and turns to be parallel with the plane of PCB 400, then turns again toward the bottom and exits. Via 706b is an example of a via that goes straight through PCB 400 without turning. Vias 706a and 706b electrically connect microprocessor 702 with electrodes 708. One of electrodes 708 may be secure card (SC) pin 710, which is connected to input/output (I/O) pin 712 of microprocessor 702 through via 706a. SC pin 710 may access data from credit cards inserted into reader 100 during a credit card transaction. SC pin 710 is a sensitive component that is protected under PCI SSC guidelines, which would have two layers of mesh on either side of SC pin 710, or a layer of mesh on one side and a secure processor on the other side. In one aspect, mesh 704 from cover 414 is below electrodes 708 and SC pin 710, and above them is microprocessor 702. In one aspect, microprocessor 702 is a secure processor under the guidelines of PCI SSC, and therefore SC pin 710 is also secure under those guidelines, despite not being under mesh 700-11. In the aspect of microprocessor 702 being a secure microprocessor, the "footprint" under microprocessor 702 is considered protected from at least the side of PCB 400 on which microprocessor 702 is mounted. The area under microprocessor 702, footprint 714, can be understood by drawing a boundary line around the border of microprocessor 702, the line perpendicular to microprocessor 702 and extending down through PCB 400 and including electrodes 708.

Another component, device 716, is not within footprint 714. Device 716 has on one side mesh 704 and on the opposite side mesh 700-11. Vias 706c and 706d, which connect device 716 with microprocessor 702, extend from microprocessor 702 through footprint 714 and then turn and continue between mesh 700-11 and 704, to device 716. Device 716 could be considered protected according to PCI SSC guidelines because of the two layers of mesh around it and because vias 706c and 706d are entirely within protected space, either between mesh 700-11 and 704, or between mesh 704 and within footprint 714.

Vias 706e and 706f connect other I/O pins of microprocessor 702 with device 718. Although vias 706e and 706f originate within footprint 714, their path traverses outside of footprint 714 and not within a protected space, making them less secure than via 706a, for example. Device 718 is positioned on the bottom of PCB 400 and outside of a protected area.

In one aspect, footprint 714 is bordered on fewer than four sides by mesh 700-11, for example three sides. By geometry, microprocessor 702 being rectangular or square in shape, footprint 714 has four sides. One side of mesh 700-11 is evident in FIG. 11. In one aspect, mesh 700-11 has no overlap with footprint 714. Mesh 704 from cover 414 may have roughly the same surface area as mesh 700-11 added to the surface area of microprocessor 702. Mesh 704 may have a slightly larger surface area because of the sidewalls to cover 414.

Figure 12:
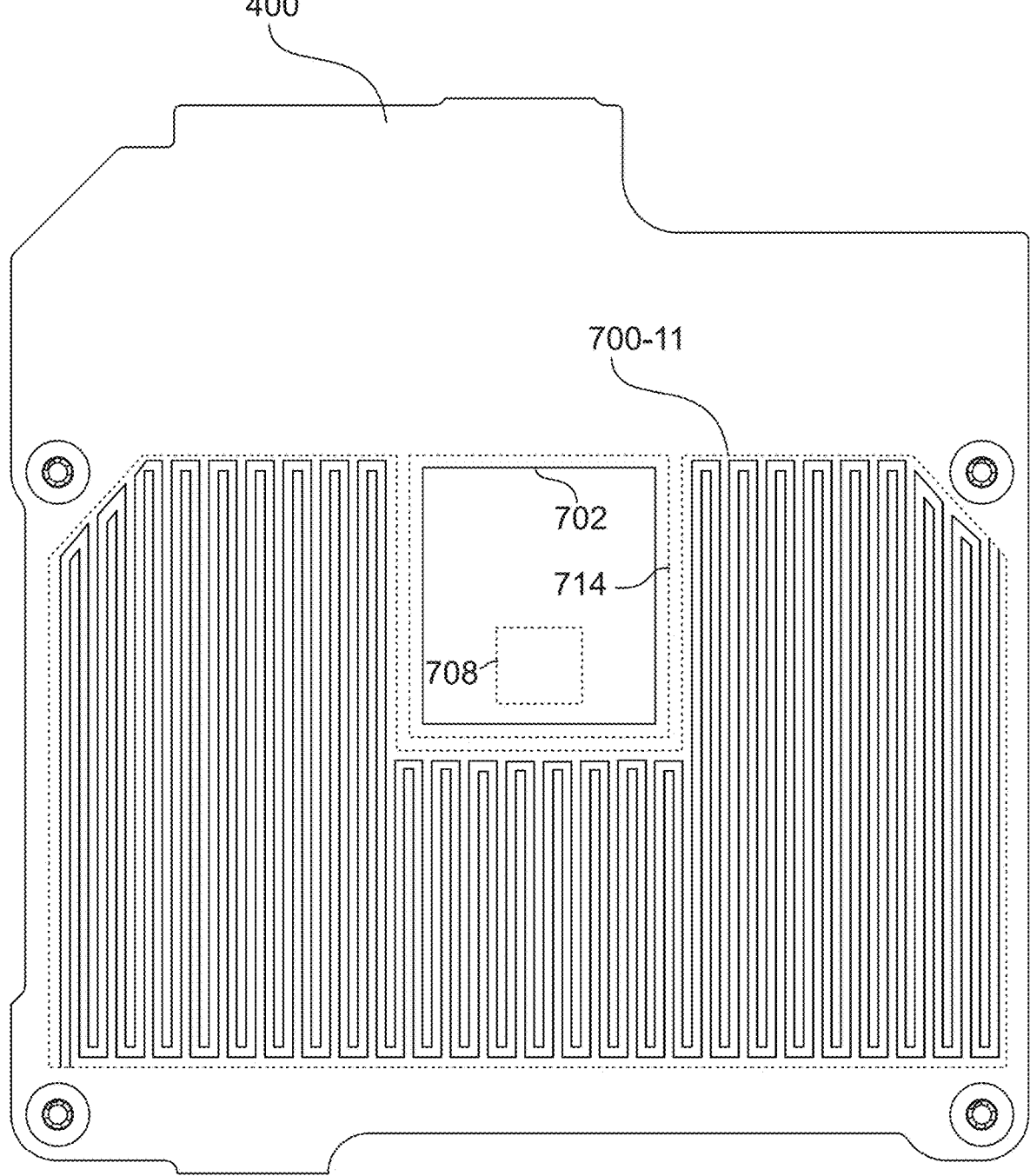
FIG. 12 is a plan view with a dimensional overlay illustrating one aspect of a printed circuit board and relative electrical component positions with respect to mesh as illustrated in FIG. 11.

FIG. 12 is a top-down plan view with a dimensional overlay illustrating one aspect of a printed circuit board and relative electrical component positions with respect to mesh as illustrated in FIG. 11. PCB 400 is illustrated from the top with microprocessor 702. Not on the surface of PCB 400 but illustrated to provide perspective on the relative relationship, is mesh 700-11 with electrical traces. Mesh 700-11 is in a mid-layer beneath the surface of PCB 400 (as illustrated in FIG. 11), but is illustrated in FIG. 12 to show the positional relationship with microprocessor 702. Footprint 714 is defined by the border of microprocessor 702 and extends down through PCB 400, or into the page of FIG. 12. In one aspect, footprint 714 has no overlap with mesh 700-11 and is surrounded by mesh 700-11 on fewer than four sides, as illustrated in FIG. 12. In one aspect footprint 714 may be surrounded by mesh 700-11 on three sides. In one aspect, footprint 714 may be surrounded by mesh on two sides, for example if microprocessor 702 were in a corner relative to the mesh. Electrodes 708 (on the bottom of PCB 400, as illustrated in FIG. 11) are illustrated for their position relative to microprocessor 702 and mesh 700-11. Not specifically illustrated in FIG. 10 but part of electrodes 708 is SC pin 710.

Figure 13:
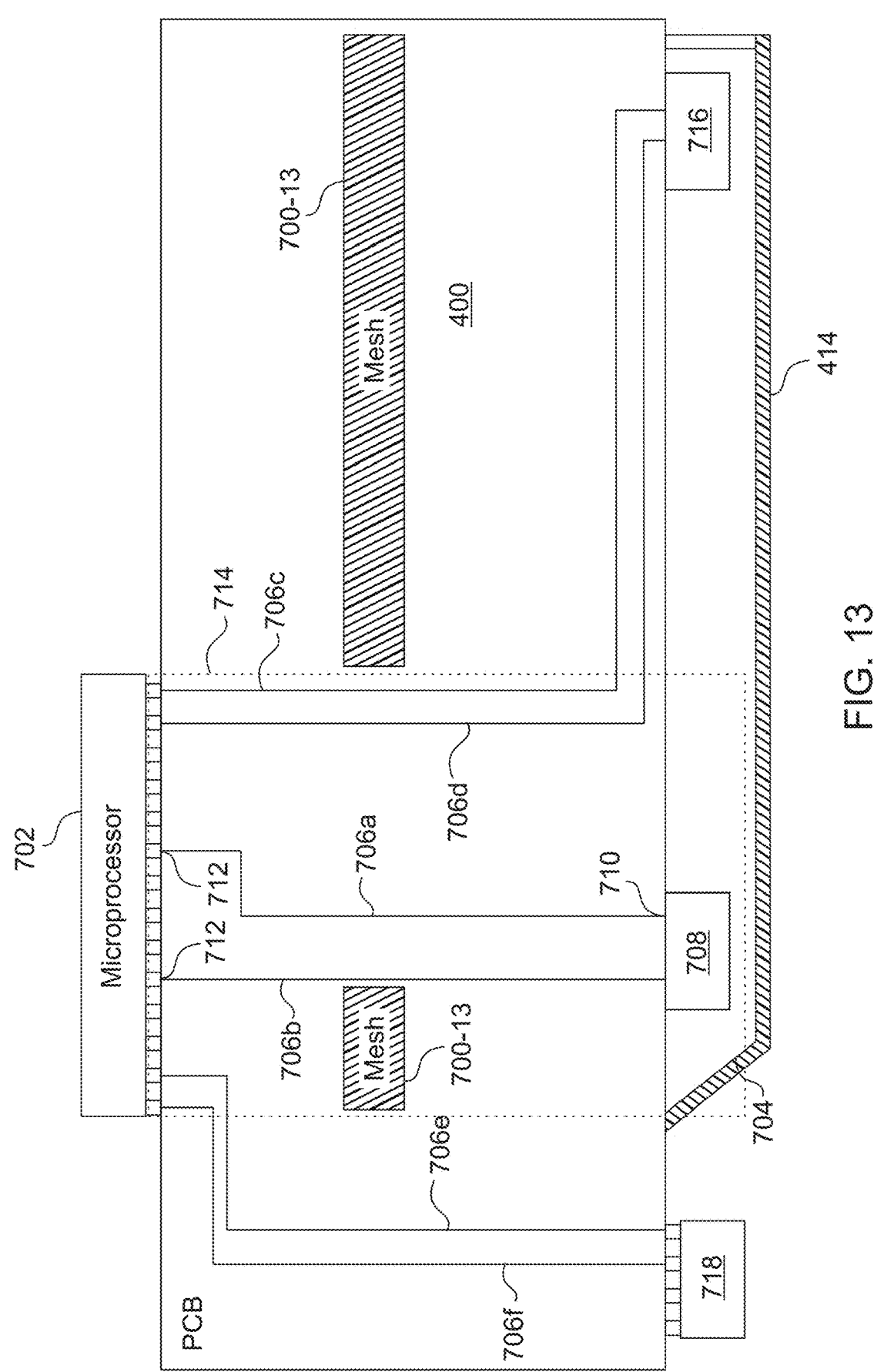
FIG. 13 is a partial cross-sectional view through line A-A of FIG. 6 illustrating one aspect of a printed circuit board and relative electrical component positions with respect to mesh.

FIG. 13 is a partial cross-sectional view through line A-A of FIG. 6 illustrating one aspect of a printed circuit board and relative electrical component positions with respect to mesh. In one aspect, PCB 400 is an eight layer stack-up with one of the layers including mesh 700-13. Microprocessor 702 is connected to the top of PCB 400 and cover 414 is connected to the bottom. Cover 414 may include mesh 704, with a plurality of electrical traces making up mesh 704 and monitored for tamper attempts. Vias 706a, 706b, 706c, 706d, 706e and 706f (collectively referred to as vias 706) extend through PCB 400 from the top to the bottom. See description for FIG. 7 with respect to "top" and "bottom" orientation, PCB 400 and vias.

Via 706a extends down from the top of PCB 400, connects to an intermediate layer and turns to be parallel with the plane of PCB 400, then turns again toward the bottom and exits. Via 706b is an example of a via that goes straight through PCB 400 without turning. Vias 706a and 706b electrically connect microprocessor 702 with electrodes 708. One of electrodes 708 may be secure card (SC) pin 710, which is connected to input/output (I/O) pin 712 of microprocessor 702 through via 706a. SC pin 710 may access data from credit cards inserted into reader 100 during a credit card transaction. SC pin 710 is a sensitive component that is protected under PCI SSC guidelines, which would have two layers of mesh on either side of SC pin 710, or a layer of mesh on one side and a secure processor on the other side. In one aspect, mesh 704 from cover 414 is below electrodes 708 and SC pin 710, and above them is microprocessor 702. In one aspect, microprocessor 702 is a secure processor under the guidelines of PCI SSC, and therefore SC pin 710 is also secure under those guidelines, despite not being under mesh 700-13. In the aspect of microprocessor 702 being a secure microprocessor, the "footprint" under microprocessor 702 is considered protected from at least the side of PCB 400 on which microprocessor 702 is mounted. The area under microprocessor 702, footprint 714, can be understood by drawing a boundary line around the border of microprocessor 702, the line perpendicular to microprocessor 702 and extending down through PCB 400 and including electrodes 708.

Another component, device 716, is not within footprint 714. Device 716 has on one side mesh 704 and on the opposite side mesh 700-13. Vias 706c and 706d, which connect device 716 with microprocessor 702, extend from microprocessor 702 through footprint 714 and then turn and continue between mesh 700-13 and 704, to device 716. Device 716 could be considered protected according to PCI SSC guidelines because of the two layers of mesh around it and because vias 706c and 706d are entirely within protected space, either between mesh 700-11 and 704, or between mesh 704 and within footprint 714.

Vias 706e and 706f connect other I/O pins of microprocessor 702 with device 718. Although vias 706e and 706f originate within footprint 714, their path traverses outside of footprint 714 and not within a protected space, making them less secure than via 706a, for example. Device 718 is positioned on the bottom of PCB 400 and outside of a protected area.

In one aspect, footprint 714 is bordered on fewer than four sides by mesh 700-13, for example three sides. By geometry, microprocessor 702 being rectangular or square in shape, footprint 714 has four sides. One side of mesh 700-13 is evident in FIG. 11. In one aspect, mesh 700-13 overlaps with footprint 714. Mesh 704 from cover 414 may have roughly the same surface area as mesh 700-13 added to the surface area of microprocessor 702, depending on the amount of overlap between mesh 700-13 and footprint 714. Mesh 704 may have a lower surface area, depending on the amount of overlap between mesh 700-13 and footprint 714.

Figure 14:
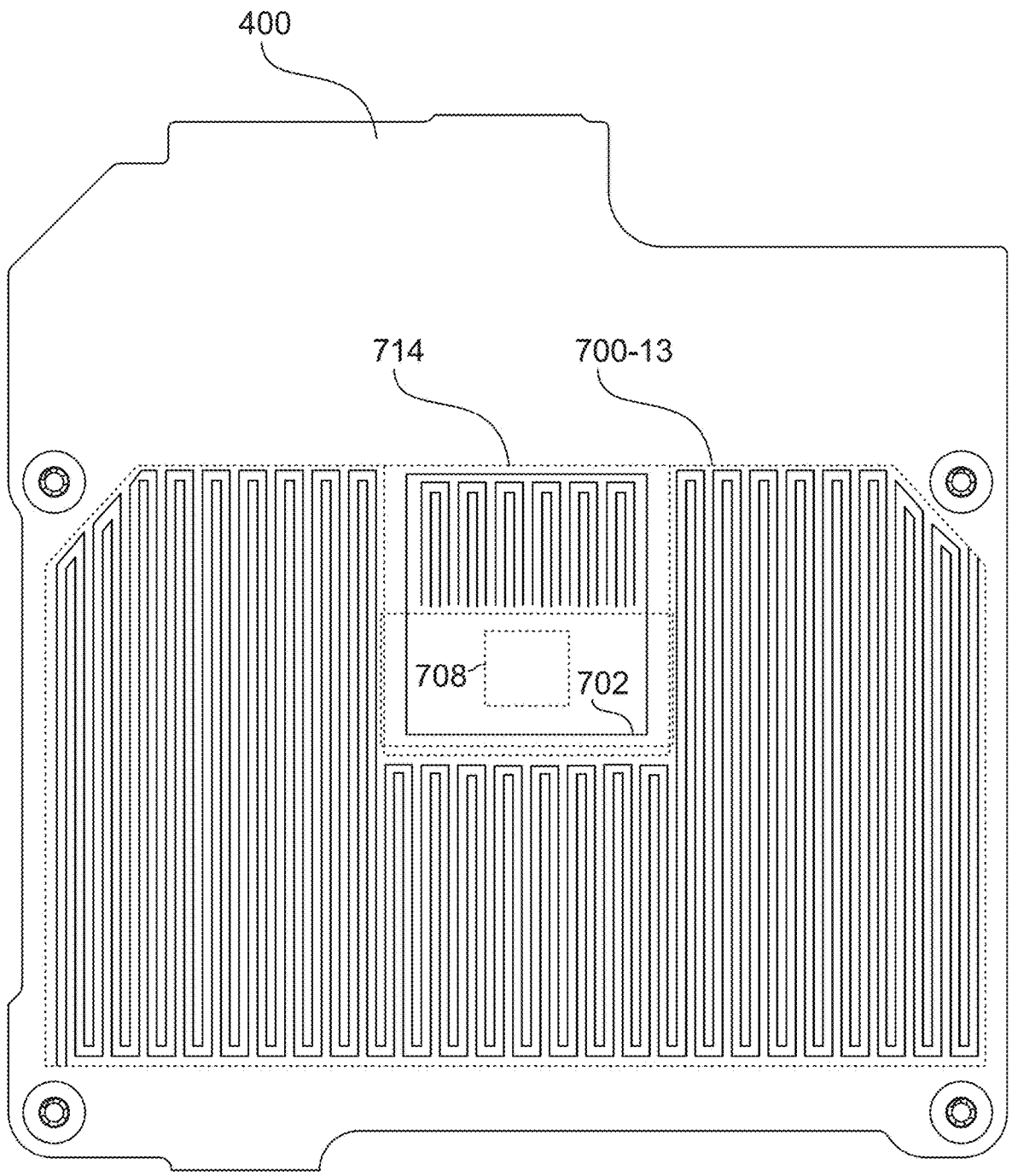
FIG. 14 is a plan view with a dimensional overlay illustrating one aspect of a printed circuit board and relative electrical component positions with respect to mesh as illustrated in FIG. 13.

FIG. 14 is a top-down plan view with a dimensional overlay illustrating one aspect of a printed circuit board and relative electrical component positions with respect to mesh as illustrated in FIG. 13. PCB 400 is illustrated from the top with microprocessor 702. Not on the surface of PCB 400 but illustrated to provide perspective on the relative relationship, is mesh 700-13 with electrical traces. Mesh 700-13 is in a mid-layer beneath the surface of PCB 400 (as illustrated in FIG. 13), but is illustrated in FIG. 14 to show the positional relationship with microprocessor 702. Footprint 714 is defined by the border of microprocessor 702 and extends down through PCB 400, or into the page of FIG. 14. In one aspect, footprint 714 overlaps with mesh 700-13 and is surrounded by mesh 700-13 on fewer than four sides, as illustrated in FIG. 14. In one aspect footprint 714 may be surrounded by mesh 700-13 on three sides. In one aspect, footprint 714 may be surrounded by mesh on two sides, for example if microprocessor 702 were in a corner relative to the mesh. Electrodes 708 (on the bottom of PCB 400, as illustrated in FIG. 13) are illustrated for their position relative to microprocessor 702 and mesh 700-13. Not specifically illustrated in FIG. 14 but part of electrodes 708 is SC pin 710.

Figure 15:
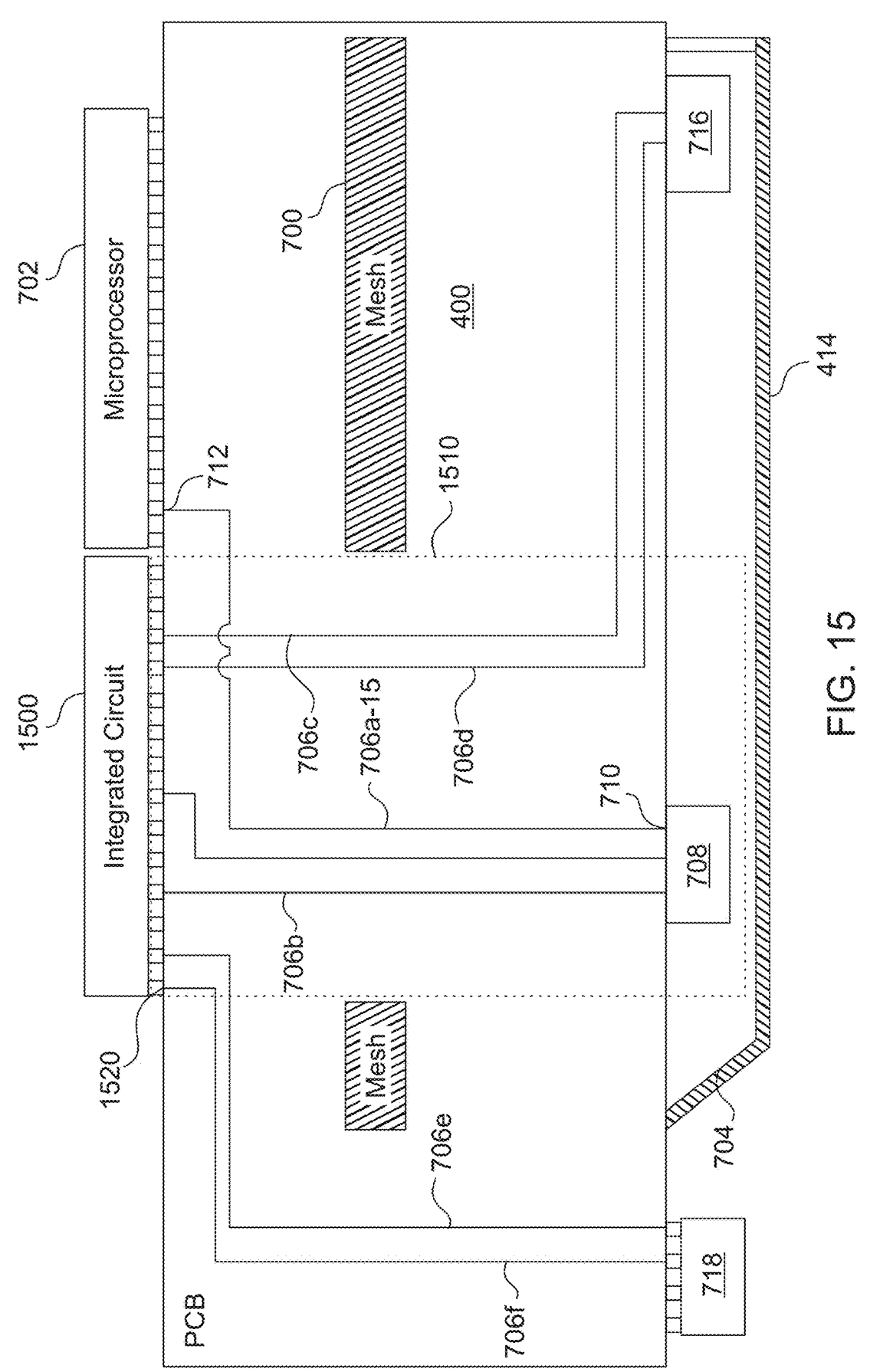
FIG. 15 is a partial cross-sectional view through line A-A of FIG. 6 illustrating one aspect of a printed circuit board and relative electrical component positions with respect to mesh.

FIG. 15 is a partial cross-sectional view through line A-A of FIG. 6 illustrating one aspect of a printed circuit board and relative electrical component positions with respect to mesh. In one aspect, PCB 400 is an eight layer stack-up with one of the layers including mesh 700. Integrated circuit 1500 and microprocessor 702 are connected to the top of PCB 400 and cover 414 is connected to the bottom. Cover 414 may include mesh 704, with a plurality of electrical traces making up mesh 704 and monitored for tamper attempts. Vias 706a-15, 706b, 706c, 706d, 706e and 706f (collectively referred to as vias 706) extend through PCB 400 from the top to the bottom. See description for FIG. 7 with respect to "top" and "bottom" orientation, PCB 400 and vias.

Via 706a-15 extends down from the top of PCB 400, connects to an intermediate layer and turns to be parallel with the plane of PCB 400, then turns again toward the bottom and exits. Via 706*b* is an example of a via that goes straight through PCB 400 without turning. Via 706*a*-15 electrically connects microprocessor 702 with electrodes 708. Via 706*b* electrically connects integrated circuit 1500 with electrodes 708. One of electrodes 708 may be secure card (SC) pin 710, which is connected to input/output (I/O) pin 712 of microprocessor 702 through via 706*a*-15. SC pin 710 may access data from credit cards inserted into reader 100 during a credit card transaction. SC pin 710 is a sensitive component that is protected under PCI SSC guidelines, which would have two layers of mesh on either side of SC pin 710, or a layer of mesh on one side and a secure processor on the other side. In one aspect, mesh 704 from cover 414 is below electrodes 708 and SC pin 710, and above them is integrated circuit 1500. In one aspect, integrated circuit 1500 and microprocessor 702 are both secure processors or circuits under the guidelines of PCI SSC, and therefore SC pin 710 is also secure under those guidelines, despite not being under mesh 700. If microprocessor 702 is sufficiently closed to integrated circuit 1500 then the protected space between them may be sufficient for via 706*a*-15 to also be protected. In the aspect of integrated circuit 1500 being a secure circuit, the "footprint" under integrated circuit 1500 is considered protected from at least the side of PCB 400 on which integrated circuit 1500 is mounted. The area under integrated circuit 1500, footprint 1510, can be understood by drawing a boundary line around the border of integrated circuit 1500, the line perpendicular to integrated circuit 1500 and extending down through PCB 400 and including electrodes 708.

Another component, device 716, is not within footprint 1510. Device 716 has on one side mesh 704 and on the opposite side mesh 700. Vias 706*c* and 706*d*, which connect device 716 with integrated circuit 1500, extend from integrated circuit 1500 through footprint 1510 and then turn and continue between mesh 700 and 704, to device 716. Device 716 could be considered protected according to PCI SSC guidelines because of the two layers of mesh around it and because vias 706*c* and 706*d* are entirely within protected space, either between mesh 700 and 704, or between mesh 704 and within footprint 1510. In the example provided in FIG. 15, SC pin 710 may face other constraints under the PCI SSC because via 706*a*-15 exits footprint 1510. If those constraints are met then SC pin 710 and its via, via 706*a*-15, will be considered secure under the guidelines.

Vias 706*e* and 706*f* connect pins 1520 of integrated circuit 1500 with device 718. Although vias 706*e* and 706*f* originate within footprint 1510, their path traverses outside of footprint 1510 and not within a protected space, making them less secure than via 706*b*, for example. Device 718 is positioned on the bottom of PCB 400 and outside of a protected area.

In one aspect, footprint 1510 is bordered on four sides by mesh 700. By geometry, integrated circuit 1500 being rectangular or square in shape, footprint 1510 has four sides. Two sides of mesh 700 are evident in FIG. 15. In one aspect, mesh 700 has no overlap with footprint 1510. Mesh 704 from cover 414 may have roughly the same surface area as mesh 700 added to the surface area of integrated circuit 1500. Mesh 704 may have a greater surface area because of the sidewalls of cover 414.

Figure 16:
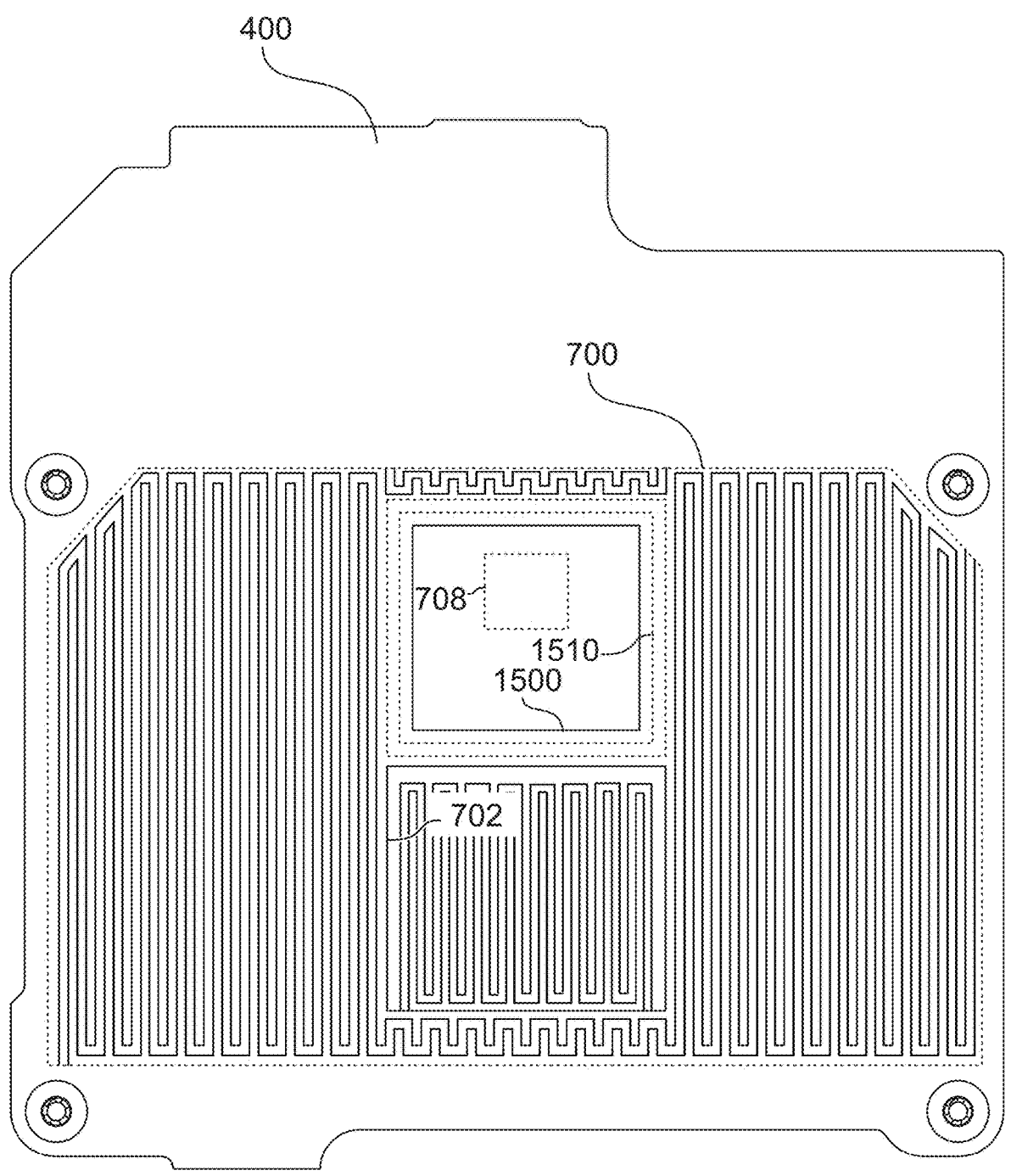
FIG. 16 is a plan view with a dimensional overlay illustrating one aspect of a printed circuit board and relative electrical component positions with respect to mesh as illustrated in FIG. 15.

FIG. 16 is a top-down plan view with a dimensional overlay illustrating one aspect of a printed circuit board and relative electrical component positions with respect to mesh as illustrated in FIG. 15. PCB 400 is illustrated from the top with integrated circuit 1500 and microprocessor 702. Not on the surface of PCB 400 but illustrated to provide perspective on the relative relationship, is mesh 700 with electrical traces. Mesh 700 is in a mid-layer beneath the surface of PCB 400 (as illustrated in FIG. 15), but is illustrated in FIG. 16 to show the positional relationship with integrated circuit 1500 and microprocessor 702. Footprint 1510 is defined by the border of integrated circuit 1500 and extends down through PCB 400, or into the page of FIG. 16. In one aspect, footprint 1510 has no overlap with mesh 700 and is surrounded by mesh 700 on four sides, as illustrated in FIG. 16. Electrodes 708 (on the bottom of PCB 400, as illustrated in FIG. 15) are illustrated for their position relative to integrated circuit 1500 and mesh 700. Not specifically illustrated in FIG. 16 but part of electrodes 708 is SC pin 710.

Figure 17:
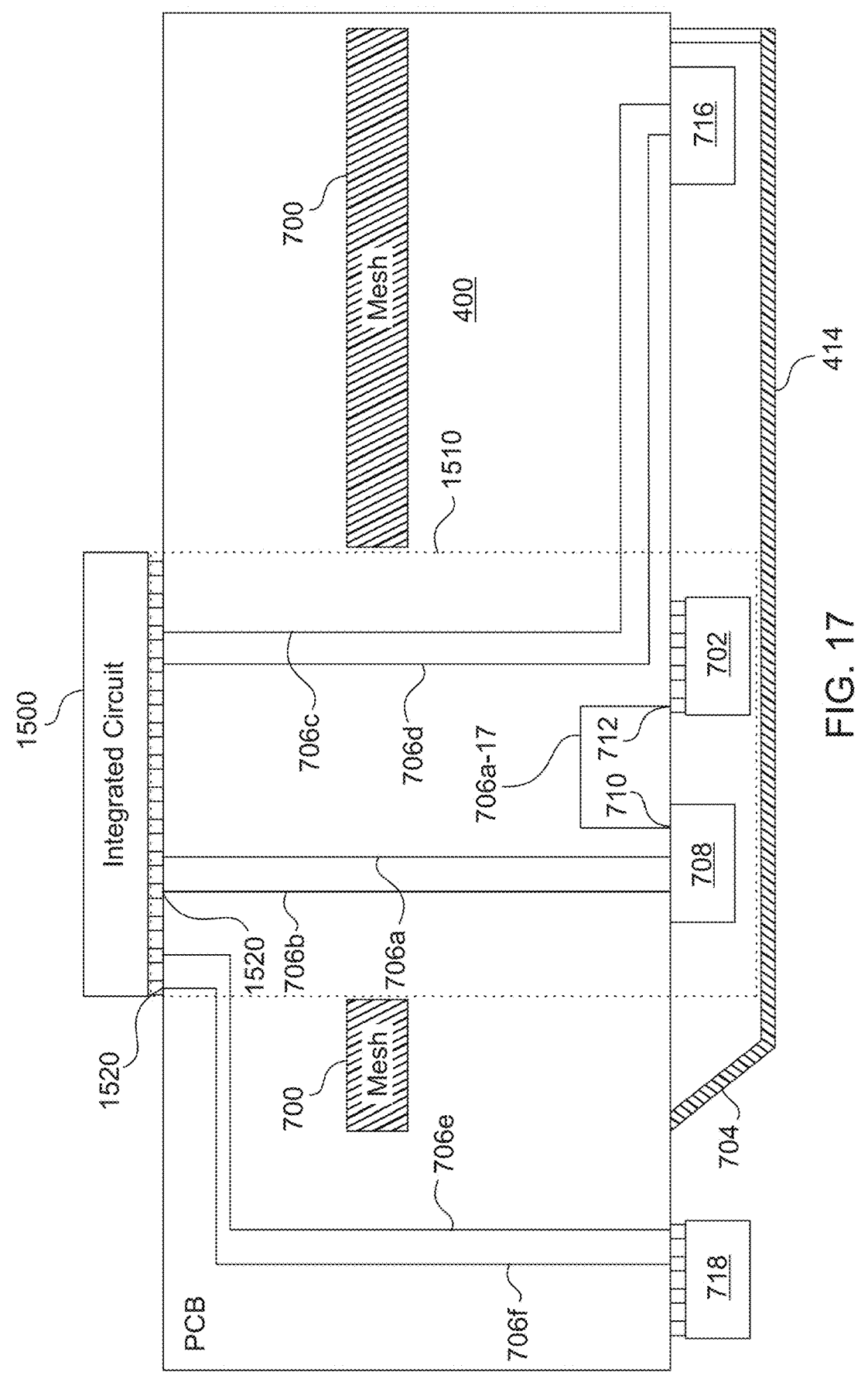
FIG. 17 is a partial cross-sectional view through line A-A of FIG. 6 illustrating one aspect of a printed circuit board and relative electrical component positions with respect to mesh.

FIG. 17 is a partial cross-sectional view through line A-A of FIG. 6 illustrating one aspect of a printed circuit board and relative electrical component positions with respect to mesh. In one aspect, PCB 400 is an eight layer stack-up with one of the layers including mesh 700. Integrated circuit 1500 is connected to the top of PCB 400, cover 414 is connected to the bottom, and microprocessor 702 is connected to the bottom of PCB 400 and within cover 414. Cover 414 may include mesh 704, with a plurality of electrical traces making up mesh 704 and monitored for tamper attempts. Vias 706*b*, 706*c*, 706*d*, 706*e* and 706*f* extend through PCB 400 from the top to the bottom. See description for FIG. 7 with respect to "top" and "bottom" orientation, PCB 400 and vias. Via 706*a*-17 connects two devices on the bottom of PCB 400.

Via 706*a*-17 extends upward from the bottom of PCB 400, connects to an intermediate layer and turns to be parallel with the plane of PCB 400, then turns again toward the bottom and exits. Via 706*b* is an example of a via that goes straight through PCB 400 without turning. Via 706*a*-17 electrically connects microprocessor 702 with electrodes 708. Via 706*b* electrically connects integrated circuit 1500 with electrodes 708. One of electrodes 708 may be secure card (SC) pin 710, which is connected to input/output (I/O) pin 712 of microprocessor 702 through via 706*a*-17. SC pin 710 may access data from credit cards inserted into reader 100 during a credit card transaction. SC pin 710 is a sensitive component that is protected under PCI SSC guidelines, which would have two layers of mesh on either side of SC pin 710, or a layer of mesh on one side and a secure processor on the other side. In one aspect, mesh 704 from cover 414 is below electrodes 708 and SC pin 710, and above them is integrated circuit 1500. In one aspect, integrated circuit 1500 is a secure processor under the guidelines of PCI SSC, and therefore SC pin 710 is also secure under those guidelines, despite not being under mesh 700. In the aspect of integrated circuit 1500 being a secure circuit, the "footprint" under integrated circuit 1500 is considered protected from at least the side of PCB 400 on which integrated circuit 1500 is mounted. The area under integrated circuit 1500, footprint 1510, can be understood by drawing a boundary line around the border of integrated circuit 1500, the line perpendicular to integrated circuit 1500 and extending down through PCB 400 and including electrodes 708.

Another component, device 716, is not within footprint 1510. Device 716 has on one side mesh 704 and on the opposite side mesh 700. Vias 706*c* and 706*d*, which connect device 716 with integrated circuit 1500, extend from integrated circuit 1500 through footprint 1510 and then turn and continue between mesh 700 and 704, to device 716. Device 716 could be considered protected according to PCI SSC guidelines because of the two layers of mesh around it and because vias 706*c* and 706*d* are entirely within protected space, either between mesh 700 and 704, or between mesh 704 and within footprint 1510.

Vias 706e and 706f connect pins 1520 of integrated circuit 1500 with device 718. Although vias 706e and 706f originate within footprint 1510, their path traverses outside of footprint 1510 and not within a protected space, making them less secure than via 706b, for example. Device 718 is positioned on the bottom of PCB 400 and outside of a protected area.

In one aspect, footprint 1510 is bordered on four sides by mesh 700. By geometry, integrated circuit 1500 being rectangular or square in shape, footprint 1510 has four sides. Two sides of mesh 700 are evident in FIG. 17. In one aspect, mesh 700 has no overlap with footprint 1510. Mesh 704 from cover 414 may have roughly the same surface area as mesh 700 added to the surface area of integrated circuit 1500. Mesh 704 may have a greater surface area because of the sidewalls of cover 414.

Figure 18:
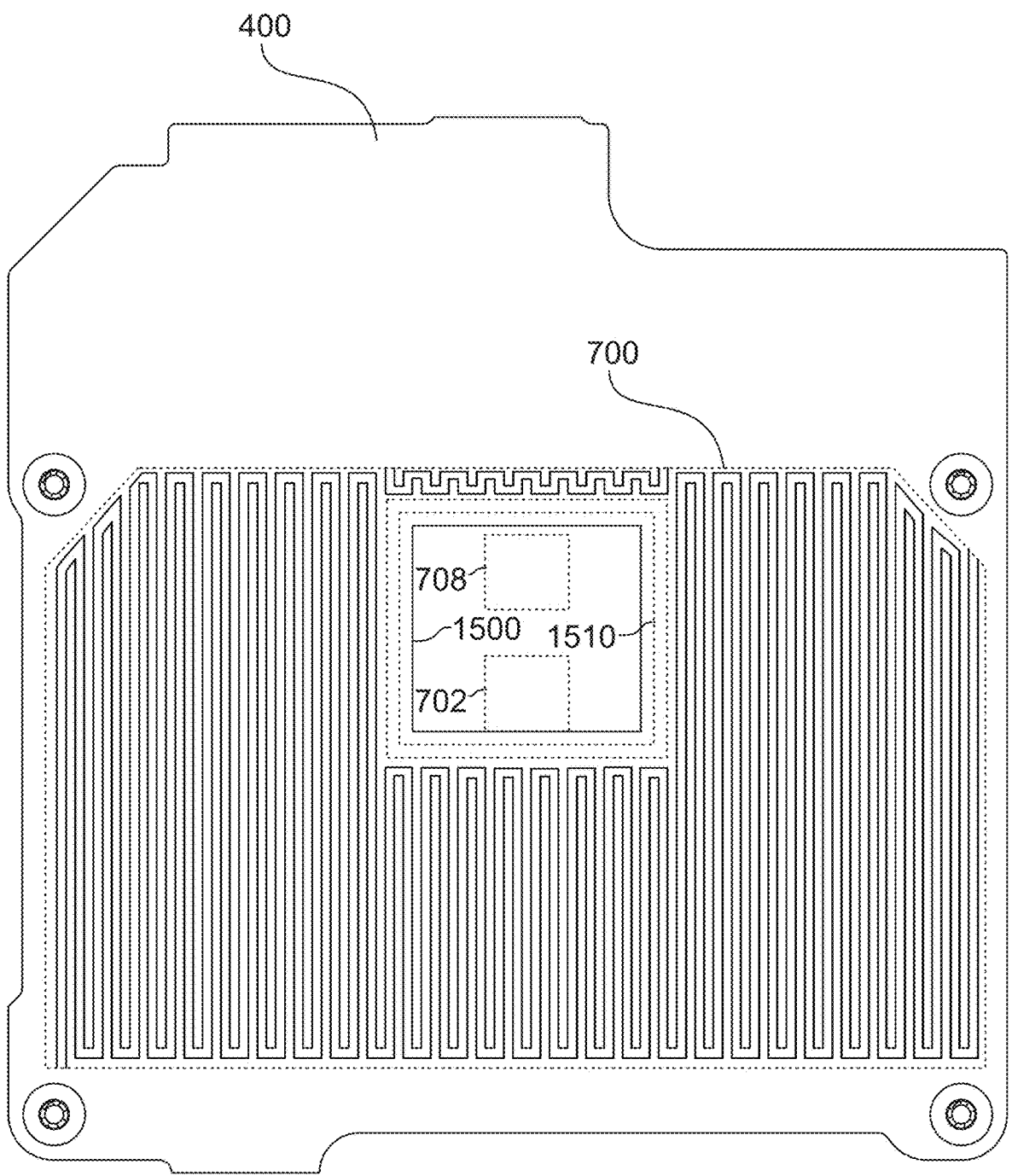
FIG. 18 is a plan view with a dimensional overlay illustrating one aspect of a printed circuit board and relative electrical component positions with respect to mesh as illustrated in FIG. 17.

FIG. 18 is a top-down plan view with a dimensional overlay illustrating one aspect of a printed circuit board and relative electrical component positions with respect to mesh as illustrated in FIG. 17. PCB 400 is illustrated from the top with integrated circuit 1500. Not on the surface of PCB 400 but illustrated to provide perspective on the relative relationship, is mesh 700 with electrical traces. Mesh 700 is in a mid-layer beneath the surface of PCB 400 (as illustrated in FIG. 17), but is illustrated in FIG. 18 to show the positional relationship with integrated circuit 1500. Footprint 1510 is defined by the border of integrated circuit 1500 and extends down through PCB 400, or into the page of FIG. 18. In one aspect, footprint 1510 has no overlap with mesh 700 and is surrounded by mesh 700 on four sides, as illustrated in FIG. 18. Electrodes 708 and microprocessor 702 (both on the bottom of PCB 400, as illustrated in FIG. 17) are illustrated for their position relative to integrated circuit 1500 and mesh 700. Not specifically illustrated in FIG. 18 but part of electrodes 708 is SC pin 710.

This disclosure refers to the term "reader" throughout, and while specifically directed towards a credit card reader, the disclosure applies equally well to a traditional credit card terminal. Nothing in the disclosure should be taken as limiting to a reader over a terminal. Moreover, many aspects of the disclosure apply equally well to any electronic device, as would be recognized by one skilled in the art.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F) PLAs) or (field) programmable gate arrays ((F) PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a sensor signal", "means for generating a transmit signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps, or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include features of a claim to any other independent claim even if this claim is not directly made dependent to the independent claim.

What is claimed is:

1. A credit card processing reader comprising:
a case;
a printed circuit board (PCB) coupled to the case, the PCB with a first side and a second side, the first and second sides parallel and opposite to one another;
an integrated circuit coupled to the first side of the PCB, the integrated circuit having a footprint defined by a boundary line drawn around the perimeter of the integrated circuit, the boundary line perpendicular to the plane of the integrated circuit and through the PCB, the integrated circuit having at an input/output (I/O) pin within the integrated circuit footprint and between the top of the integrated circuit and the first side of the PCB;
a first security mesh coupled to the PCB and including a plurality of electrical traces as part of an electrical circuit, the first security mesh existing on a plane parallel to the first and second sides, the first security mesh outside the footprint of the integrated circuit;
a via that extends through the PCB from the first side to the second side, the via entirely within the footprint of the integrated circuit; and
an electrode coupled to the second side of the PCB, the electrode configured to access data from a credit card during a credit card transaction, the electrode coupled to the via.

2. The credit card processing reader of claim 1 wherein the first security mesh is entirely outside the footprint of the integrated circuit.

3. The credit card processing reader of claim 1 further comprising:
a cover coupled to the second side of the PCB; and
a second security mesh coupled to the cover and including a plurality of electrical traces as part of an electrical circuit.

4. The credit card processing reader of claim 1 wherein the first security mesh overlaps at least a portion of the integrated circuit footprint.

5. The credit card processing reader of claim 4 wherein the second security mesh forms a plane parallel to the cover and has a surface area approximately equal to the surface area of the first security mesh added to the surface area of the integrated circuit.

6. The credit card processing reader of claim 1 wherein the electrode is within the integrated circuit footprint.

7. The credit card processing reader of claim 1 wherein the via traverses in a straight line from the first side of the PCB to the second side of the PCB.

8. The credit card processing reader of claim 7 wherein the electrode is a secure card pin.

9. The credit card processing reader of claim 1 wherein the via traverses through the PCB from the first side to the second side in a line having a plurality of turns, such that at least part of the via is not perpendicular to the PCB.

10. The credit card processing reader of claim 1 wherein the electrode is one of a plurality of electrodes including a secure card pin, the I/O pin is one of a plurality of I/O pins, the via is one of a plurality of vias, the plurality of electrodes electrically coupled to the plurality of I/O pins through the plurality of vias and entirely within the integrated circuit footprint.

11. The credit card processing reader of claim 10 where at least one of the plurality of vias extends outside the integrated circuit footprint.

12. The credit card processing reader of claim 1 wherein the plurality of electrical traces of the first security mesh have a spacing between two immediately adjacent traces of no more than 150 micrometers.

13. A credit card processing reader comprising:
a case;
a printed circuit board (PCB) coupled to the case, the PCB with a first side and a second side, the first and second sides parallel and opposite to one another;
a cover coupled to the second side of the PCB;
a security measure comprising:
a security mesh with a plurality of electrical traces, the security mesh coupled to the PCB and to the cover; and
a secure processor coupled to the first side of the PCB, the secure processor over, along a perspective axis that is perpendicular to the PCB, a portion of the PCB that is nonoverlapping on the PCB with the security mesh coupled to the PCB.

14. The credit card processing reader of claim 13 wherein the plurality of electrical traces have a spacing between two immediately adjacent traces of no more than 150 micrometers.

15. The credit card processing reader of claim 14 wherein the secure processor over a portion of the PCB is entirely nonoverlapping on the PCB with the security mesh coupled to the PCB.

16. The credit card processing reader of claim 14 further comprising:
an input/output (I/O) pin coupled to the secure processor and between the top of the secure processor and the first side of the PCB;
a via extending through the PCB from the first side to the second side of the PCB; and
an electrode coupled to the second side of the PCB and electrically coupled to the via, the electrode configured to convey data from a credit card during a transaction.

17. The credit card processing reader of claim 16 wherein the via traverses through the PCB from the first side to the second side in a line having a plurality of turns, such that the via is not entirely perpendicular to the PCB.

18. The credit card processing reader of claim 16 wherein the via extends through the PCB in a straight line, the via electrically connected to the I/O pin, the electrode further comprising a secure card (SC) pin, the SC pin coupled to the secure processor through the via.

19. The credit card processing reader of claim 13 further comprising:
an input/output (I/O) pin coupled to the secure processor and between the top of the secure processor and the first side of the PCB;
a via extending through the PCB from the first side to the second side of the PCB; and
an electrode coupled to the second side of the PCB and electrically coupled to the via, the electrode configured to convey data from a credit card during a transaction.

20. The credit card processing reader of claim 19 wherein the via extends through the PCB in a straight line, the via electrically connected to the I/O pin, the electrode further comprising a secure card (SC) pin, the SC pin coupled to the secure processor through the via.

* * * * *